US011681196B2

(12) United States Patent
Hasegawa et al.

(10) Patent No.: US 11,681,196 B2
(45) Date of Patent: Jun. 20, 2023

(54) ELECTROCHROMIC DEVICE, CONTROL DEVICE OF ELECTROCHROMIC DEVICE, AND CONTROL METHOD OF ELECTROCHROMIC DEVICE

(71) Applicant: Ricoh Company, Ltd., Tokyo (JP)

(72) Inventors: Tohru Hasegawa, Kanagawa (JP); Keiichiroh Yutani, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 343 days.

(21) Appl. No.: 16/928,249

(22) Filed: Jul. 14, 2020

(65) Prior Publication Data

US 2021/0033939 A1 Feb. 4, 2021

(30) Foreign Application Priority Data

Jul. 30, 2019 (JP) .............................. JP2019-139469

(51) Int. Cl.
*G02F 1/157* (2006.01)
*G02F 1/155* (2006.01)
*G02F 1/163* (2006.01)

(52) U.S. Cl.
CPC .............. *G02F 1/157* (2013.01); *G02F 1/155* (2013.01); *G02F 1/163* (2013.01)

(58) Field of Classification Search
CPC ........... G02F 1/157; G02F 1/155; G02F 1/163
USPC ....................................................... 359/265
See application file for complete search history.

(56) References Cited

U.S. PATENT DOCUMENTS

| | | | |
|---|---|---|---|
| 2010/0017201 A1 | 7/2010 | Gustavsson et al. | |
| 2016/0026059 A1 | 1/2016 | Chung et al. | |
| 2016/0041447 A1 | 2/2016 | Yamamoto et al. | |
| 2016/0349590 A1 | 12/2016 | Ohshima et al. | |
| 2017/0315357 A1 | 11/2017 | Katano et al. | |
| 2018/0252979 A1 | 9/2018 | Park et al. | |
| 2019/0031694 A1 | 1/2019 | Sagisaka et al. | |
| 2019/0219883 A1* | 7/2019 | Kim ....................... G02F 1/1516 |
| 2019/0227401 A1 | 7/2019 | Yutani et al. | |
| 2019/0285960 A1 | 9/2019 | Sasa et al. | |

FOREIGN PATENT DOCUMENTS

| | | |
|---|---|---|
| DE | 10 2015 109 409 A1 | 1/2016 |
| JP | 63-115139 A | 5/1988 |
| JP | 2-216131 | 8/1990 |
| JP | 2-291529 | 12/1990 |

(Continued)

OTHER PUBLICATIONS

Extended European Search Report dated Sep. 29, 2020 in European Patent Application No. 20186091.3, 12 pages.

(Continued)

*Primary Examiner* — Edward J Glick
*Assistant Examiner* — William D Peterson
(74) *Attorney, Agent, or Firm* — Xsensus LLP

(57) ABSTRACT

An electrochromic device includes: an electrochromic element operating in at least one of a first optical characteristic state and a second optical characteristic state; and a temperature measuring device configured to measure temperature, and circuitry to control voltage to be applied to the electrochromic element such that the second optical characteristic state becomes constant irrespective of the measured temperature.

14 Claims, 15 Drawing Sheets

(56) References Cited

FOREIGN PATENT DOCUMENTS

| | | |
|---|---|---|
| JP | 5-178645 | 7/1993 |
| JP | 10-020829 | 1/1998 |
| JP | 2004-507775 | 3/2004 |
| JP | 2004-205628 | 7/2004 |
| JP | 2005-031628 | 2/2005 |
| JP | 2014-119639 | 6/2014 |
| JP | 2015-076658 | 4/2015 |
| JP | 2015-630613 A | 10/2015 |
| JP | 2016-38583 A | 3/2016 |
| JP | 2016-218360 | 12/2016 |
| JP | 2017-090617 | 5/2017 |
| JP | 2017-198825 | 11/2017 |
| JP | 2017-207840 | 11/2017 |
| JP | 2018-010084 | 1/2018 |
| JP | 2018-033983 | 3/2018 |
| JP | 2018-155796 | 10/2018 |
| JP | 2019-164249 | 9/2019 |
| WO | WO2002/017008 A2 | 2/2002 |
| WO | 2014/025690 A1 | 2/2014 |
| WO | WO2014/059268 A2 | 4/2014 |

OTHER PUBLICATIONS

Office Action dated Feb. 14, 2022 in European Patent Application No. 20 186 091.3, 9 pages.

Japanese Office Action dated Dec. 16, 2022, in corresponding Japanese Patent Application 2019-139469.

* cited by examiner

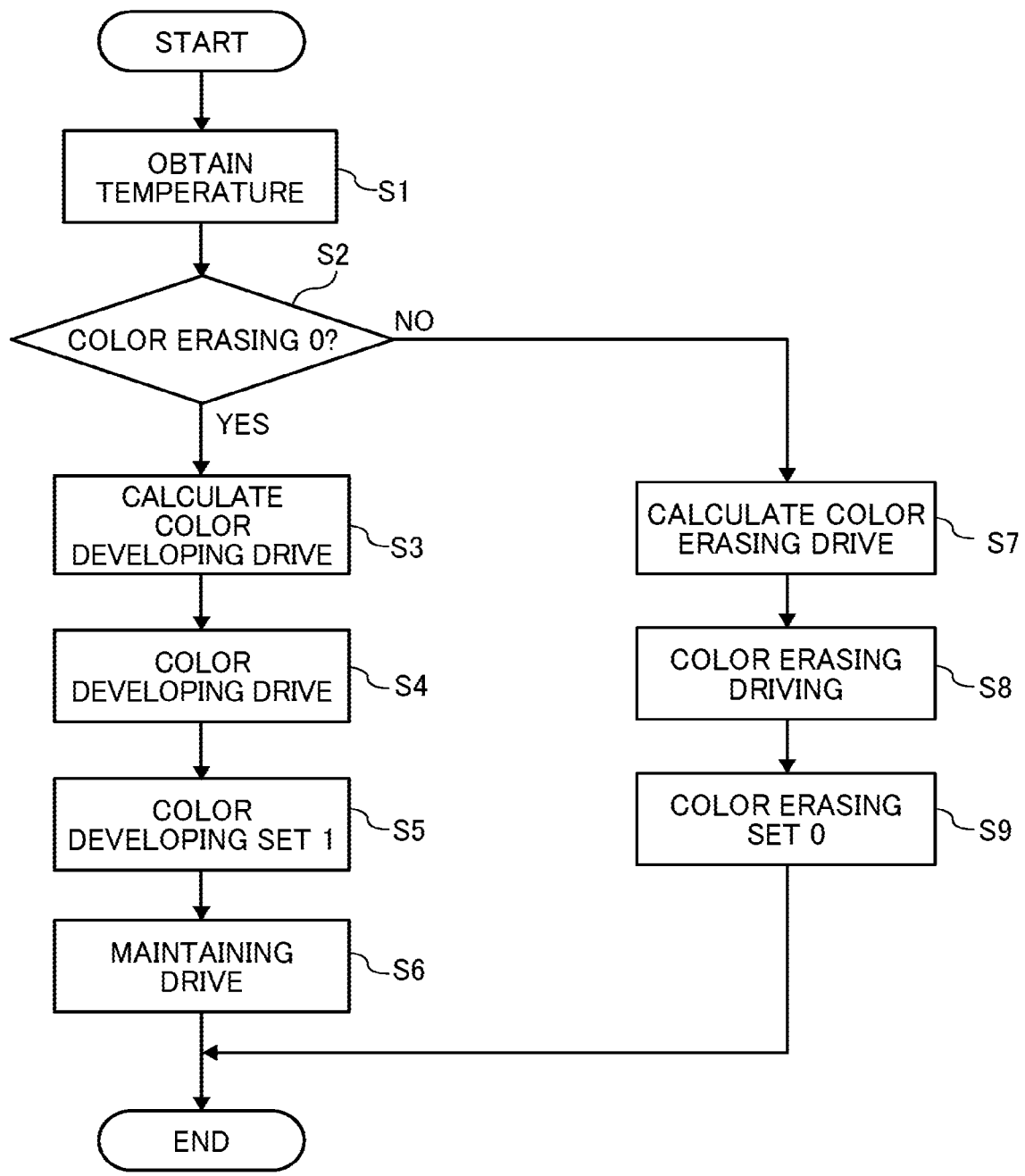

ELECTROCHROMIC DEVICE, CONTROL DEVICE OF ELECTROCHROMIC DEVICE, AND CONTROL METHOD OF ELECTROCHROMIC DEVICE

CROSS-REFERENCE TO RELATED APPLICATIONS

This patent application is based on and claims priority pursuant to 35 U.S.C. § 119(a) to Japanese Patent Application No. 2019-139469, filed on Jul. 30, 2019, in the Japan Patent Office, the entire disclosure of which is hereby incorporated by reference herein.

BACKGROUND

Technical Field

The embodiments of the present invention relate to an electrochromic device, a control device of an electrochromic device, and a control method of an electrochromic device.

Discussion of the Background Art

The known electrochromic device includes an electrochromic element and an applied voltage control device that controls a voltage to be applied to the electrochromic element.

For example, the electrochromic window glass disclosed in JP-3399967-B receives a value of a predetermined voltage set point as a function of temperature T and generates a potential difference according to the value of the set point. According to the potential difference, a switching time for coloring or decoloring to obtain a predetermined degree of coloring or decoloring is adjusted to be constant with respect to the predetermined degree of coloring or decoloring regardless of electrolyte temperature.

However, the electrochromic device disclosed in JP-3399967-B has a disadvantage that the electrochromic element is easily deteriorated.

SUMMARY

Example embodiments include an electrochromic device including: an electrochromic element operating in at least one of a first optical characteristic state and a second optical characteristic state; a temperature measuring device to measure temperature, and circuitry to control voltage to be applied to the electrochromic element, such that the second optical characteristic state becomes constant irrespective of the measured temperature.

In one embodiment, the circuitry changes a length of a period in which voltage is applied to shift from a first optical characteristic state to a second optical characteristic state such that the second optical characteristic state becomes constant irrespective of the measured temperature.

In one embodiment, the circuitry applies a periodic fluctuation voltage periodically fluctuating in at least one period of a period in which voltage is applied to shift from a first optical characteristic state to a second optical characteristic state and a period in which voltage is applied to maintain the second optical characteristic state, and adjusts an application time ratio of a voltage of a relatively large value in one period of the periodic fluctuation voltage such that the second optical characteristic state becomes constant irrespective of temperature.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is a flowchart of applied voltage change control of the spectacles according to an example;

Figure 1A:
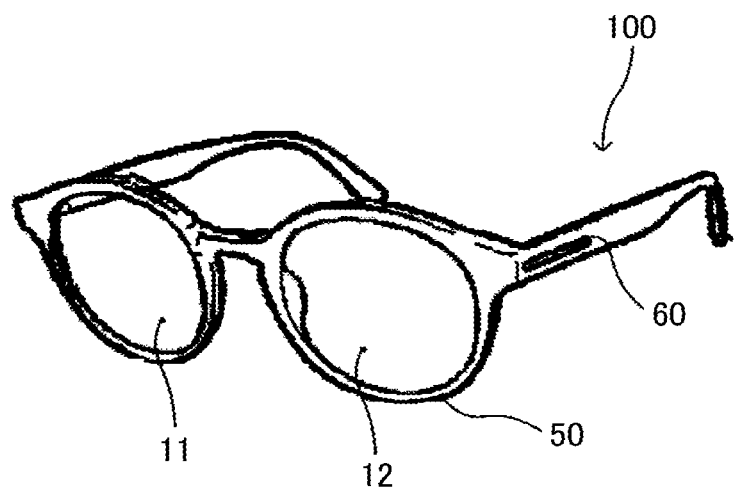
FIG. 1A is a perspective view of spectacles as an example of a light control device.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Figure 1B:
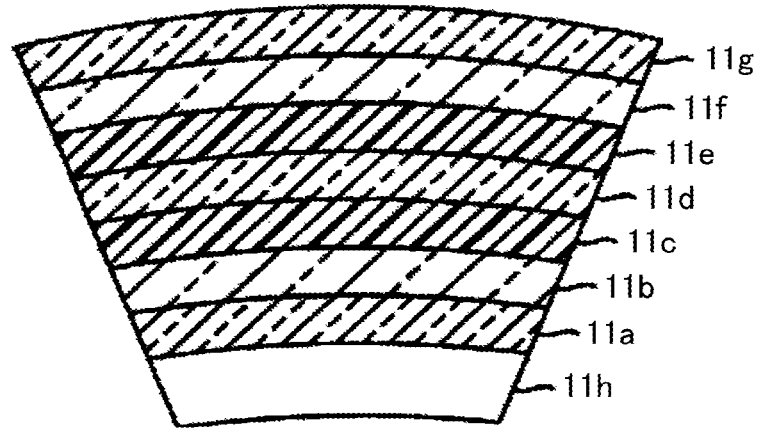
FIG. 1B is a cross-sectional view of an optical lens device in the spectacles.

The following embodiment describes an example case in which an optical lens device including an electrochromic device is incorporated as a spectacle lens of spectacles (light control spectacles). FIG. 1A is a perspective view of the spectacles, and FIG. 1B is a cross-sectional view of the optical lens device (light control lens). Spectacles 100 include a first spectacle lens 11 and a second spectacle lens 12 as the optical lens devices, a frame 50, and a switch 60. The spectacles 100 has a basic configuration that is substantially the same as that disclosed in JP-2018-10084-A. The term "lens" also includes a lens portion not having so-called power.

The first spectacle lens 11 and the second spectacle lens 12 are processed in shape according to a rim shape of the frame 50 and are incorporated in the frame 50. The frame 50 includes the switch 60, a power source 40 (refer to FIG. 2) and the like.

FIG. 1B is a cross-sectional view of the optical lens device (light control lens). An electrochromic element of FIG. 1B is provided on a lens substrate 11h. Specifically, a first electrode layer 11b, an electrochromic (EC) layer 11c, and an insulating inorganic particle layer 11d are formed on a first substrate 11a.

A second electrode layer 11f is formed on a second substrate 11g.

A surface of the insulating inorganic particle layer 11d and a surface of the second electrode layer 11f are disposed so as to face each other, with a gap provided between the insulating inorganic particle layer 11d and the second electrode layer 11f. The first electrode layer 11b and the second electrode layer 11f are adhered to each other with an electrolyte layer 11e filled therebetween. In this manner, the electrochromic element is produced. Details and specific examples of the electrochromic element are described later.

In the spectacles 100 as a light control device, when the electrochromic element is used as the light control lens, the electrochromic element is bent by thermoforming into a desired shape. After that, a resin is additionally formed on an outer surface of the bent electrochromic element to thicken the substrate. By grinding the thickened substrate, a desired curved surface is formed, and by performing a lens process (power process and the like) according to a user-specific condition, the light control lens may be obtained. Alternatively, a manufacturing process of adhering the bent electrochromic element to a manufactured lens (for example, resin lens) may also be applied.

Figure 2:
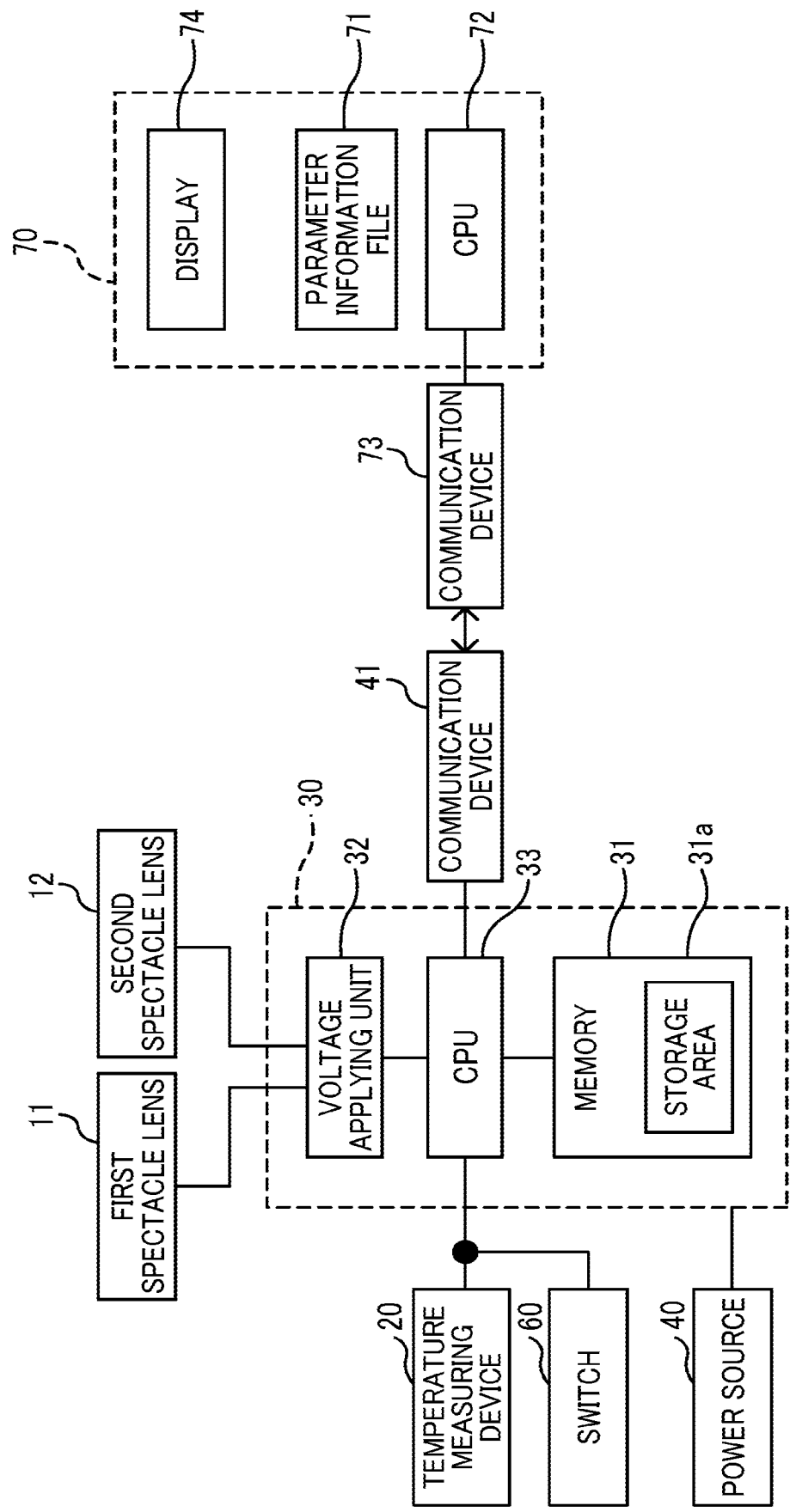
FIG. 2 is a block diagram illustrating the spectacles as an example of the light control device in FIG. 1A.

FIG. 2 is a block diagram illustrating the spectacles 100 as an example of the light control device. The spectacles 100 include the first spectacle lens 11, the second spectacle lens 12, a temperature measuring device 20, a control device 30, the power source 40 which supplies power to the control device 30 and the like, and the switch 60.

The first spectacle lens 11 and the second spectacle lens 12 are the electrochromic elements. The first spectacle lens 11 and the second spectacle lens 12 are connected to a voltage applying unit 32 (may be referred to as the voltage applying device 32) of the control device 30, and the voltage applying unit 32 applies a voltage based on a voltage applying condition. The voltage applying unit 32 may be implemented by any circuit capable of applying voltage.

The temperature measuring device 20 is connected to a central processing unit (CPU) 33 of the control device 30 to output information on measured temperature to the CPU 33. Any desired temperature sensor may be used as the temperature measuring device 20. The temperature measuring device 20 may be installed at a frame portion in the vicinity of the spectacle lenses 11 and 12, for example.

The control device 30 includes a memory 31, the voltage applying unit 32, and the CPU 33. The control device 30 reads or writes the voltage applying condition from or on the memory 31, and controls the voltage applying unit 32 to apply the voltage to the first spectacle lens 11 and the second spectacle lens 12 based on the read voltage applying condition.

In the control device 30, the CPU 33 calculates information on the temperature input from the temperature measuring device 20, and writes a new voltage applying condition obtained based on the calculation result on the memory 31.

The control device 30 has a function of rewriting information on the calculated new voltage applying condition using the temperature information. Such information is, for example, a parameter that changes according to the temperature and/or software in which a parameter calculating process is described. More particularly, the memory 31 includes a storage area (file) 31a for registering the parameter and/or software.

The memory 31 also stores a setup module in the form of software, so as to control input of data from an external personal computer 70 to register and/or rewrite data on the storage area 31a.

The personal computer 70 includes a central processing unit (CPU) 72, a memory that stores a file 71 of information such as the parameter, a display 74, and a communication device 73 that enables the personal computer 70 to communicate with the spectacles 100.

Similarly, the spectacles 100 include a communication device 41 that enables the spectacles 100 to communicate with the personal computer 70. While the communication devices 73 and 41 may each be any desired communication circuit of wired or wireless, a device capable of performing wireless communication is preferable. A mobile terminal such as a smartphone may be used in place of the personal computer 70.

The power source 40 supplies power to an entire light control device (spectacles 100) via the control device 30.

For example, by applying a voltage between the first electrode layer 11b and the second electrode layer 11f, the first spectacle lens 11 and the second spectacle lens 12 develop a predetermined color. In a case where the second electrode layer 11f is grounded, a negative voltage is applied to the first electrode layer 11b. By applying an inverse voltage between the first electrode layer 11b and the second electrode layer 11f, the first spectacle lens 11 and the second spectacle lens 12 erase color to be transparent. In a case where the second electrode layer 11f is grounded, a positive voltage is applied to the first electrode layer 11b.

Depending on a characteristic of a material used for the electrochromic layer, there is a case of applying the negative voltage between the first electrode layer 11b and the second electrode layer 11f to develop color and of applying the positive voltage therebetween to erase color to be transparent. After developing color once, a color developing state continues without applying the voltage between the first electrode layer 11b and the second electrode layer 11f.

Figure 3:
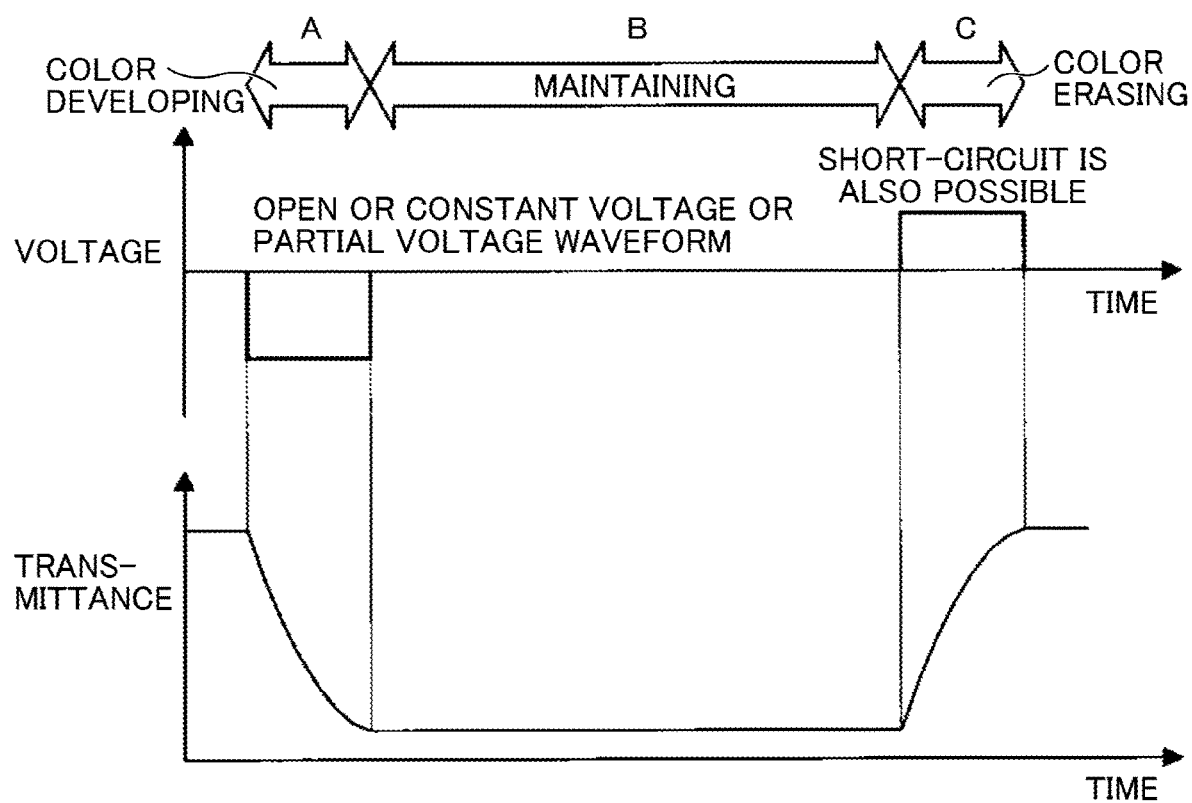
FIG. 3 is an explanatory graph of drive control of the spectacles as an example of the light control device in FIG. 1A.

FIG. 3 is an explanatory graph of drive control of the spectacles 100. In an upper-half graph, time is plotted along the abscissa and the voltage applied to the first electrode layer 11b in a case where the second electrode layer 11f is grounded is plotted along the ordinate. In a lower-half graph, a time is plotted along the abscissa and a light transmittance (hereinafter, simply referred to as transmittance) is plotted along the ordinate. A period A is a color developing period. In such period, voltage is applied to shift from a transparent state in which the color is erased and the transmittance is high to a state in which the transmittance decreases and the color is developed. A maintaining period B is a period in which the previous state (that is, either the first or second optical characteristic state) is maintained. In this particular example, a maintaining period B is a period in which the color developing period is completed and the color developing state is maintained. A color erasing period C is a period in which the color is erased from the color developing state in the maintaining period to shift to an original transparent color erasing state.

In an example in FIG. 3, the negative voltage is continuously applied to the first electrode layer 11b during the color developing period A. During the color erasing period C, the positive voltage is continuously applied to the first electrode layer 11b. In the color erasing period C, the first electrode layer 11b may also be grounded instead of applying the positive voltage (the first electrode layer 11b and the second electrode layer 11f are short-circuited). During the maintaining period B, the first electrode layer 11b may be floated (the first electrode layer 11b and the second electrode layer 11f are opened). Alternatively, in the maintaining period B, a negative constant voltage may be continuously applied to the first electrode layer 11b. Alternatively, in the maintaining period B, a periodic fluctuation voltage (effective voltage is negative) which fluctuates periodically may be applied.

Figure 4A:
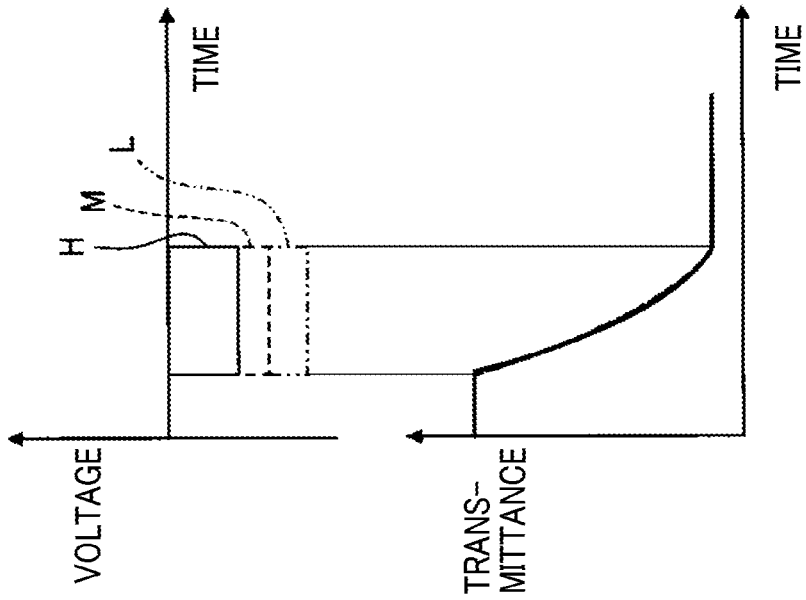
FIG. 4A is an explanatory graph of color developing drive of the spectacles as an example of the light control device.

FIG. 4A is an explanatory graph of color developing drive of the spectacles 100. As in FIG. 3, in an upper-half graph, the voltage applied to the first electrode layer 11b is plotted along the ordinate, and in a lower-half graph, the transmittance is plotted along the ordinate. A solid line indicates a case where temperature is relatively high, a broken line indicates a case of room temperature, and a dashed-two dotted line indicates a case where the temperature is relatively low.

In this embodiment, as illustrated in FIG. 4A, a length of a period (color developing period A) in which the voltage is applied to shift from the color erasing state (a first optical characteristic state) to the color developing state (a second optical characteristic state) is changed such that the color developing state (the second optical characteristic state) is a constant optical characteristic state (constant transmittance) irrespective of the temperature.

Specifically, magnitude of the applied voltage is made constant and the length of the color developing period A is made longer as the temperature is lower such that a final transmittance is constant irrespective of the temperature.

That is, although there are several candidates of products when producing the electrochromic element, a certain operating temperature range is required for all the products. It is necessary to meet specifications such as the transmittance within this temperature range. Since a reaction characteristic of the electrochromic element changes depending on the temperature in general, a case might occur where the transmittance and the like does not meet the specification depending on the temperature with the same control method (same applied voltage and application time).

Figure 4B:
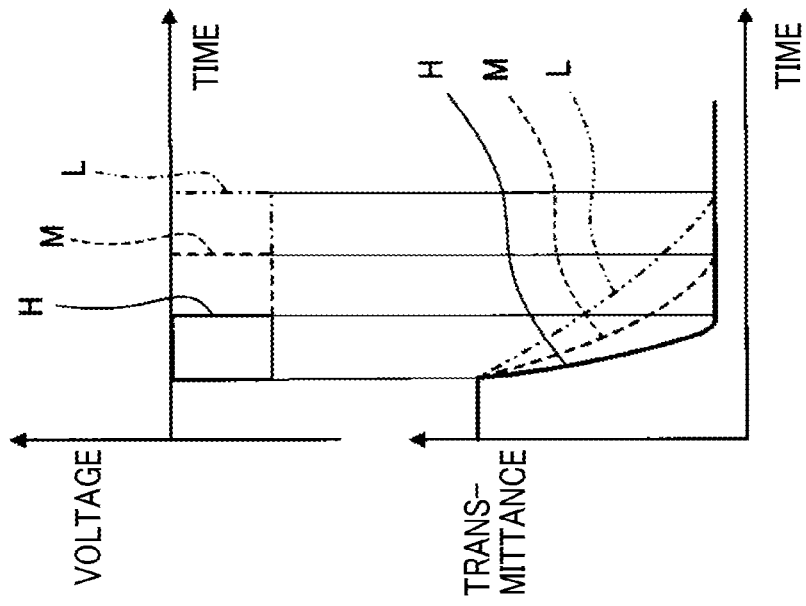
FIG. 4B is an explanatory graph of a comparative example.

FIG. 4B is an explanatory graph of a comparative example. Conventionally, the magnitude of the voltage is changed according to the temperature such that the final transmittance becomes constant with the same length of the color developing period irrespective of the temperature. Specifically, the lower the temperature, the larger the applied voltage. Therefore, there is a case where a voltage higher than that in normal time (normal temperature) is applied, and there is a possibility that the electrochromic element is deteriorated by application of the large voltage at low temperature. The normal time (normal temperature) may be any value previously defined.

In contrast, according to a method of applying the voltage during the color developing period in this embodiment in FIG. 4A, the length of the color developing period A is changed in order to obtain the constant transmittance regardless of the temperature, so that it is not required to increase the applied voltage as the temperature is lower, and the degree of deterioration may be lowered. Even in a case where the applied voltage is increased, since the length of the color developing period A is changed, it is possible to lower a degree of increase in the applied voltage as the temperature becomes lower.

Further, transmittance of the electrochromic element tends to change greatly with respect to the applied voltage, but change only slightly with respect to the application time. Accordingly, by controlling the time, more accurate transmittance may be obtained. In manufacturing a circuit, it is easier to achieve a circuit with a smaller size and lower cost, for a circuit with a function of changing the time as compared to a circuit with a function of changing the voltage.

In FIG. 4A, the length of the color developing period A is changed according to the temperature, but the length of the color erasing period C may also be changed similarly according to the temperature.

FIG. 5 is a flowchart illustrating example operation of controlling change in applied voltage of the spectacles 100. The operation of FIG. 5 is performed by the CPU 33 when it is detected that the switch 60 provided on the frame 50 of the spectacles 100 is operated to switch between color development and color erasing.

At S1, the temperature information being a measurement result is obtained from the temperature measuring device 20.

At S2, the CPU 33 determines whether the spectacle is in a color erasing state "0" at that time. For this determination, a flag and the like which is set to 1 at the end of the color developing period A and set to 0 at the end of the color erasing period C is used. When the CPU 33 determines that it is in the color erasing state, the CPU 33 calculates a drive condition for the color developing drive at S3.

The above-described calculation is performed using the temperature information. The parameters that change according to the temperature may be discrete parameters corresponding to a temperature range divided into a plurality of sections (ranges). It is possible to discretely determine the length of the color developing period A for each of three ranges of high temperature, normal temperature, and low temperature as illustrated in FIG. 4A. The determined values are then stored in the memory 31 in the form of a look-up table or embedded (programmed) in the software stored in the storage area 31a. Alternatively, the parameters that change according to the temperature may be continuous parameters calculated from a function with the temperature as a variable.

At S4, the CPU 33 performs color developing using the calculated parameters. When the color developing is completed, the flag is set to "1", and the operation proceeds to S6 to start maintaining drive, and the procedure ends. The parameters used for the maintaining drive may be calculated using the temperature information.

In a case where the CPU 33 determines that it is not in the color erasing state "0", that is, it is in the color developing state at S2 described above, the operation proceeds to S7 to calculate a drive condition of color erasing drive. This calculation is also performed by using the temperature information. The parameters that change according to the temperature may be discrete or continuous as at S3.

At S8, the CPU 33 controls the voltage applying unit 32 to perform color erasing using the calculated parameter, and when this is completed, the flag is set to "0" and the operation ends.

A drive control process is not limited to the operation described in FIG. 3. A variation of the drive control process is hereinafter described.

Figure 6:
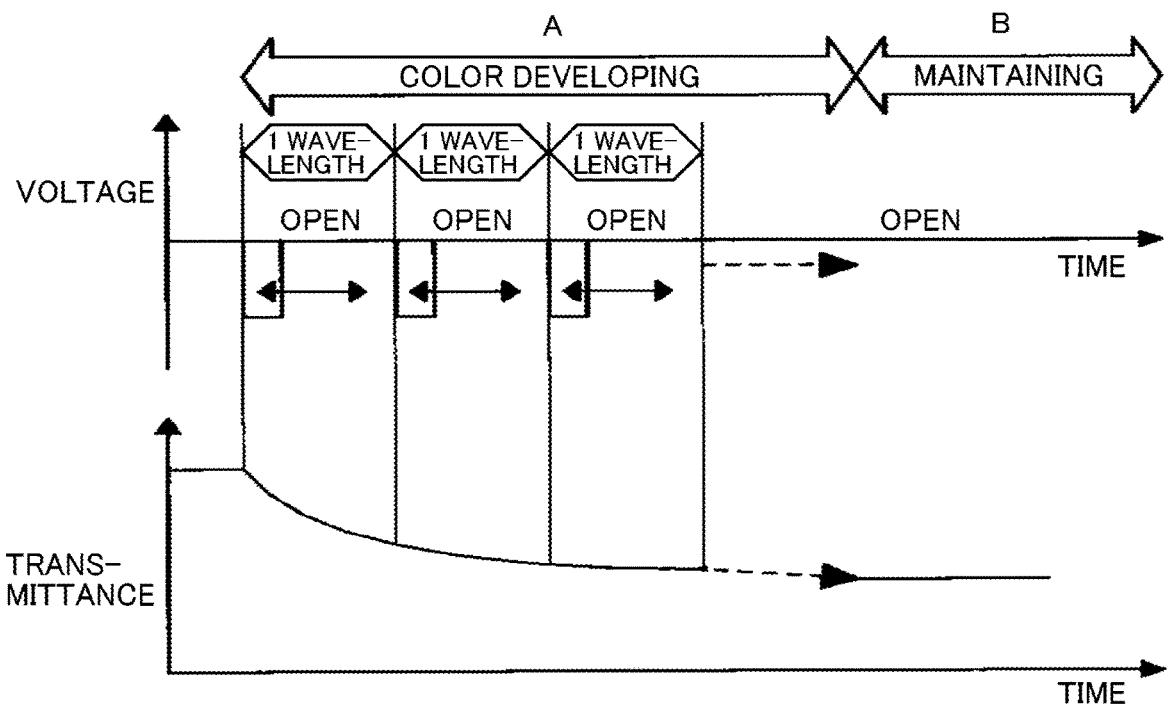
FIG. 6 is an explanatory graph of drive control according to a variation 1.

FIG. 6 is an explanatory graph of drive control according to a variation 1. In this variation 1, as the applied voltage in the color developing period A, a periodic fluctuation voltage which fluctuates periodically is used. Specifically, an intermittent voltage including ON and OFF (float/opening of the first electrode layer 11b) is used. Depending on the temperature, a duty ratio being a ratio of an ON time in one period (application time ratio of the voltage of a relatively large value in one period) is changed. Specifically, it is changed such that a duty increases as the temperature is lower. In FIG. 6, the change in duty ratio is indicated by an arrow.

In this disclosure, the relatively large value is any value having an absolute value than the voltage that is needed to maintain optical characteristic state. The polarity of its value changes depending on whether the optical characteristic state transitions to the first optical characteristic state, or to the second optical characteristic state.

Figure 7:
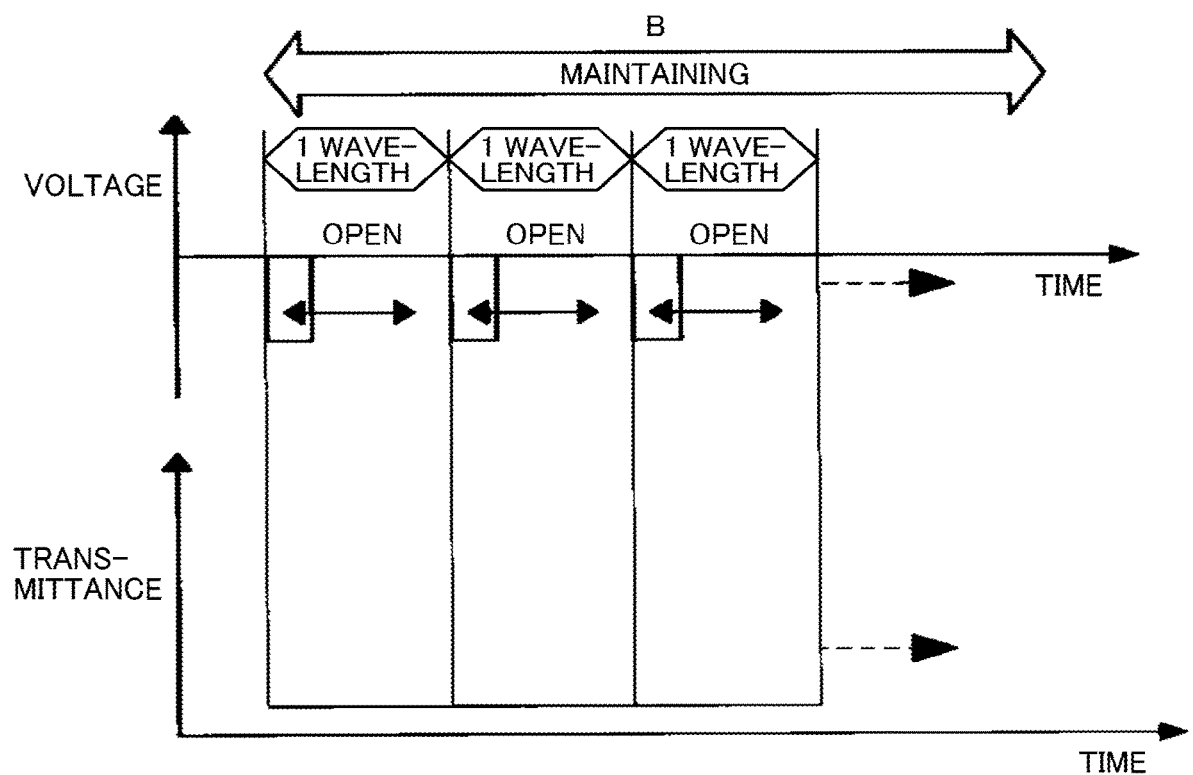
FIG. 7 is an explanatory graph of drive control according to a variation 2.

FIG. 7 is an explanatory graph of drive control according to a variation 2. In this example, the same intermittent voltage as that in the variation 1 is used in the maintaining period B. The duty ratio is changed depending on the temperature. Specifically, it is changed such that a duty increases as the temperature is lower. It is also possible to use the similar intermittent voltage during the color erasing period C and change the duty ratio depending on the temperature. It is also possible to use the intermittent voltage in any two periods or in all the three periods out of the three periods of A, B, and C and change the duty ratio depending on the temperature.

Figure 8:
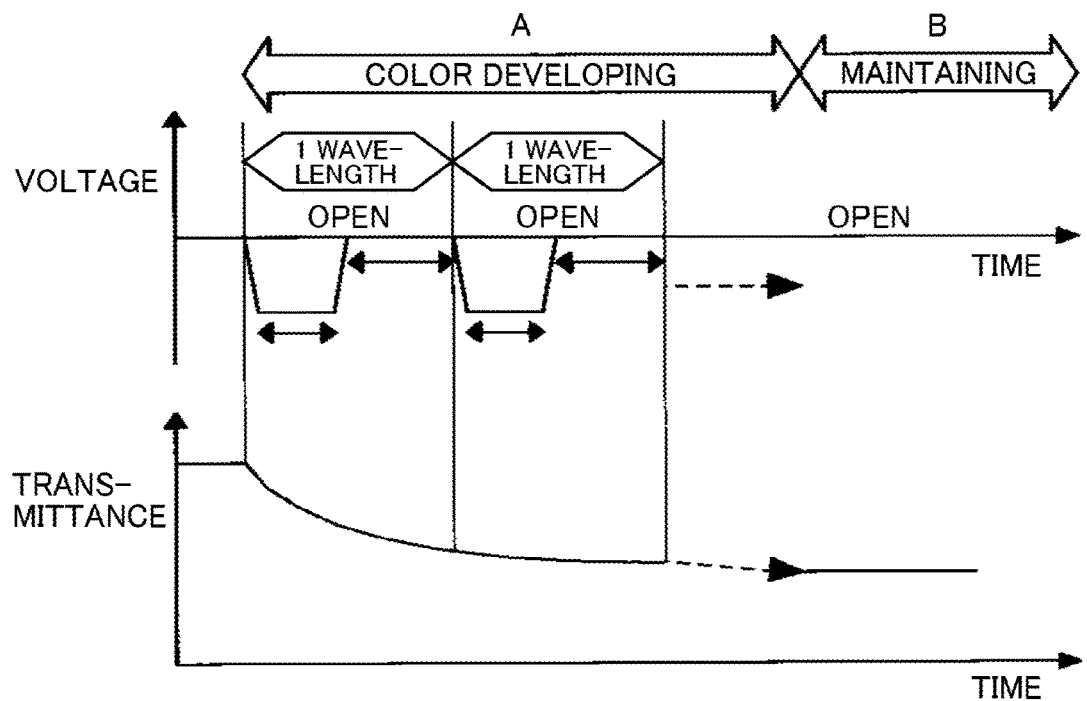
FIG. 8 is an explanatory graph of drive control according to a variation 3.

FIG. 8 is an explanatory graph of drive control according to a variation 3. As an applied voltage in the color developing period A, a trapezoidal wave (trapezoid in an ON period and float/opening of the first electrode layer in an off period) as a periodic fluctuation voltage which fluctuates periodically is used.

Figure 9:
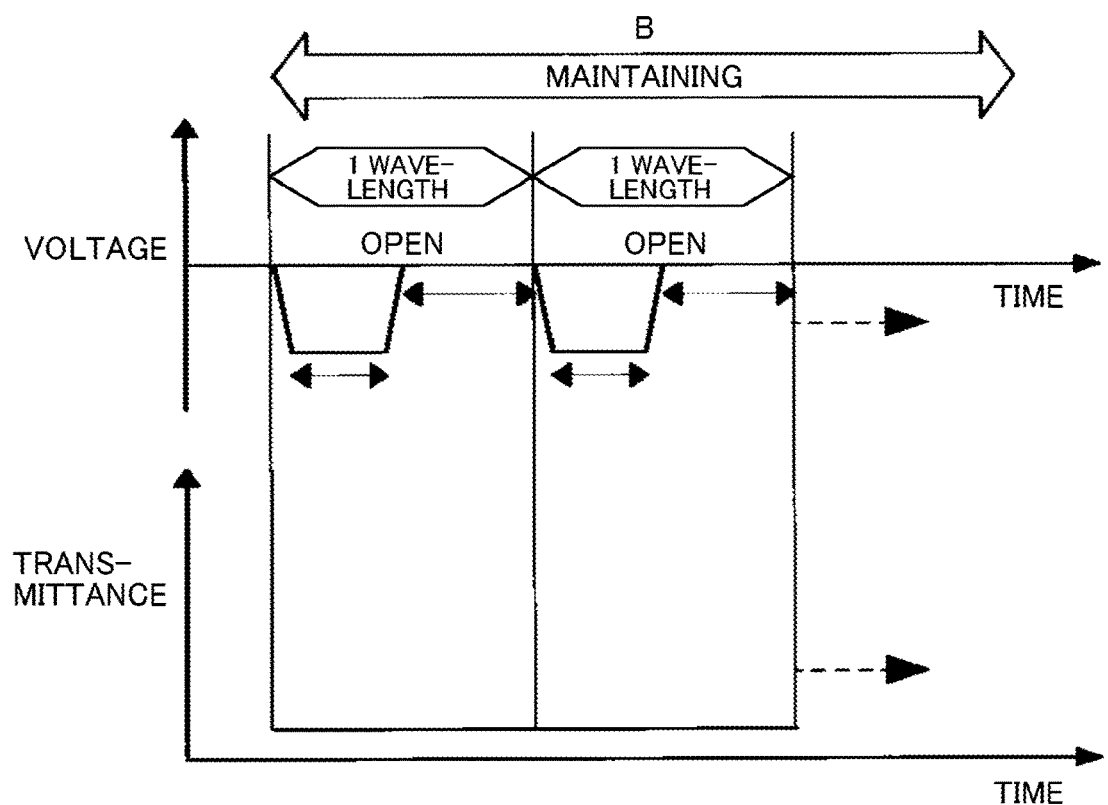
FIG. 9 is an explanatory graph of drive control according to a variation 4.

FIG. 9 is an explanatory graph of drive control according to a variation 4. In the maintaining period B, the trapezoidal wave is used. It is possible to use the trapezoidal wave in any two periods or in all the three periods of the three periods of A, B, and C and change the duty ratio depending on the temperature. During the color developing period A and the color erasing period C, if the color development and color erasing may be performed with a single trapezoidal wave (only one waveform), the wave may be single.

FIGS. 10A to 12B are explanatory graphs of drive control according to variations 5 to 10. In these variations, a stepwise voltage waveform as suggested in JP-6478041-B is used.

Figure 10B:
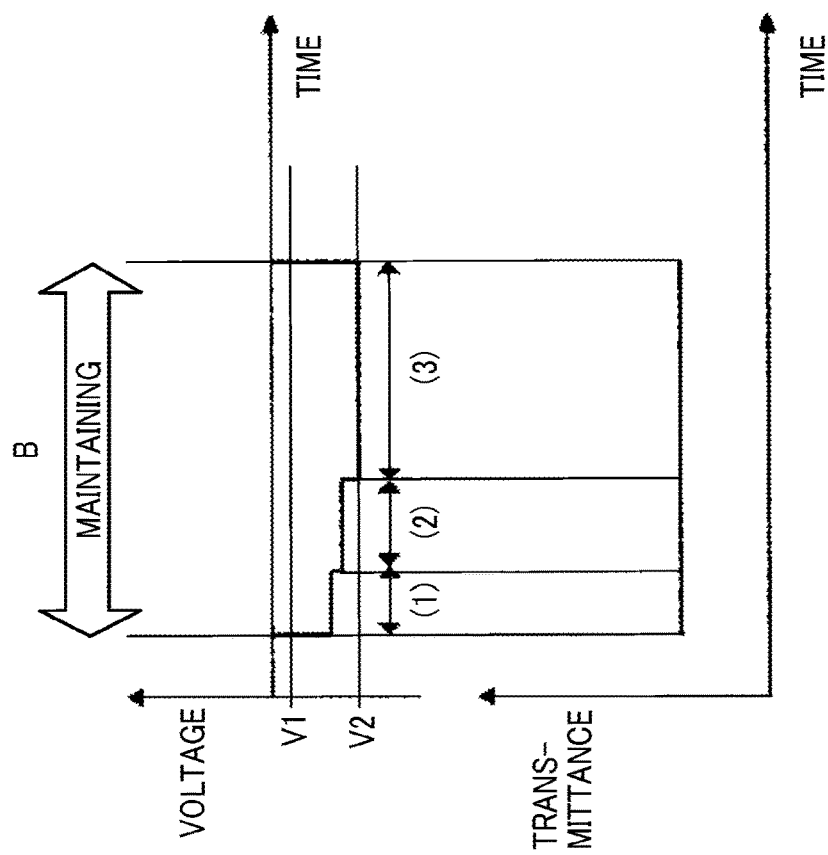
FIG. 10B is an explanatory graph of drive control according to variation 6.
Figure 10A:
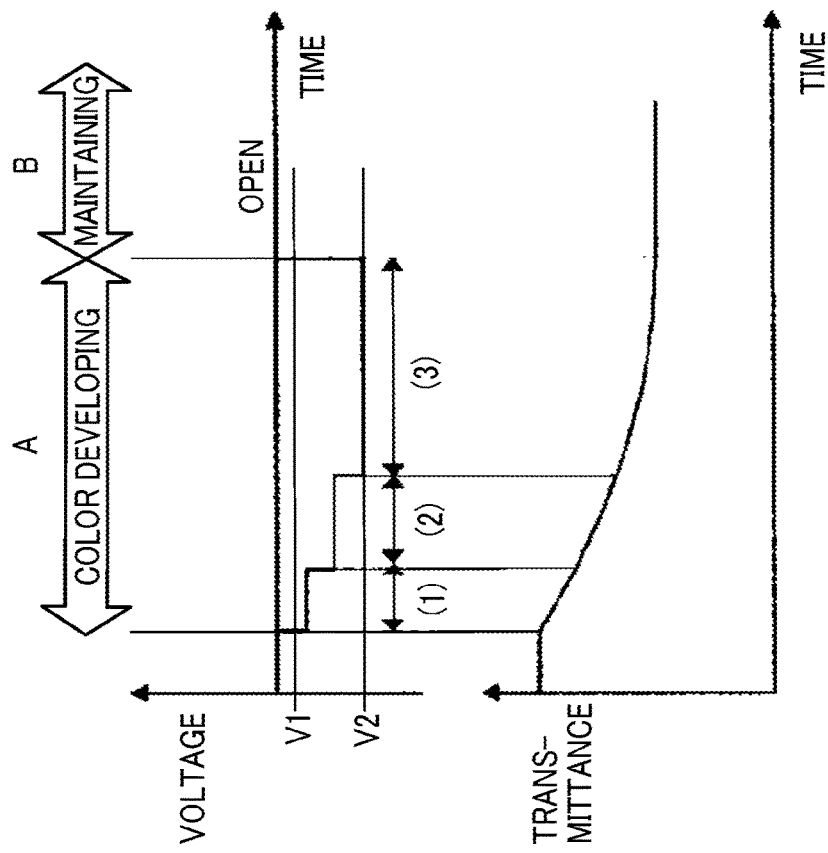
FIG. 10A is an explanatory graph of drive control according to variation 5.

The variation 5 illustrated in FIG. 10A uses the following stepwise voltage waveform in the color developing period A.

(1) to (2) are steps of applying between the two electrodes a stepwise voltage waveform maintaining at least two or more voltages between a threshold voltage V1 required for an electrochromic compound or electrochromic composition to cause color change and a voltage V2 higher than the threshold voltage V1. (3) is a step of applying the voltage V2 between the two electrodes are at least included. Steps (1) to (3) are performed in this order.

At steps (1) and (2) described above, by applying the stepwise voltage waveform which maintains at least two or more voltages between the voltages V1 and V2, a large current due to the voltage applied when the electrochromic element develops color may be dispersed, thereby lowering deterioration due to the large current at the time of color production.

At step (3) described above, by applying the voltage V2, the electrochromic element is put into a desired color developing state.

By changing time lengths at steps (1) to (3) according to the temperature as indicated by arrows, the transmittance in the color developing state is made constant. Specifically, the time lengths change such that the application time ratio of the voltage of the relatively large value increases as the temperature is lower. It is also possible to change the time lengths such that a total application time is longer as the temperature is lower with a ratio of each voltage constant.

The variation 6 in FIG. 10B is an example of using a stepwise voltage waveform similar to that in FIG. 10A in the maintaining period B. Depending on the characteristic of the electrochromic element, the transmittance minutely changes when it is continuously maintained at a constant voltage. Such electrochromic element can be effectively controlled by minutely changing the applied voltage for maintaining according to an elapsed time of maintaining, so as to maintain the transmittance constant. In this control, the applied voltage is changed as follows depending on the temperature. That is, the applied voltage is changed such that the application time ratio of the voltage of the relatively large value increases as the temperature is lower. Alternatively, it is also possible to change such that a total application time in the maintaining period B is longer as the temperature is lower with a ratio of each voltage constant.

Figure 11A:
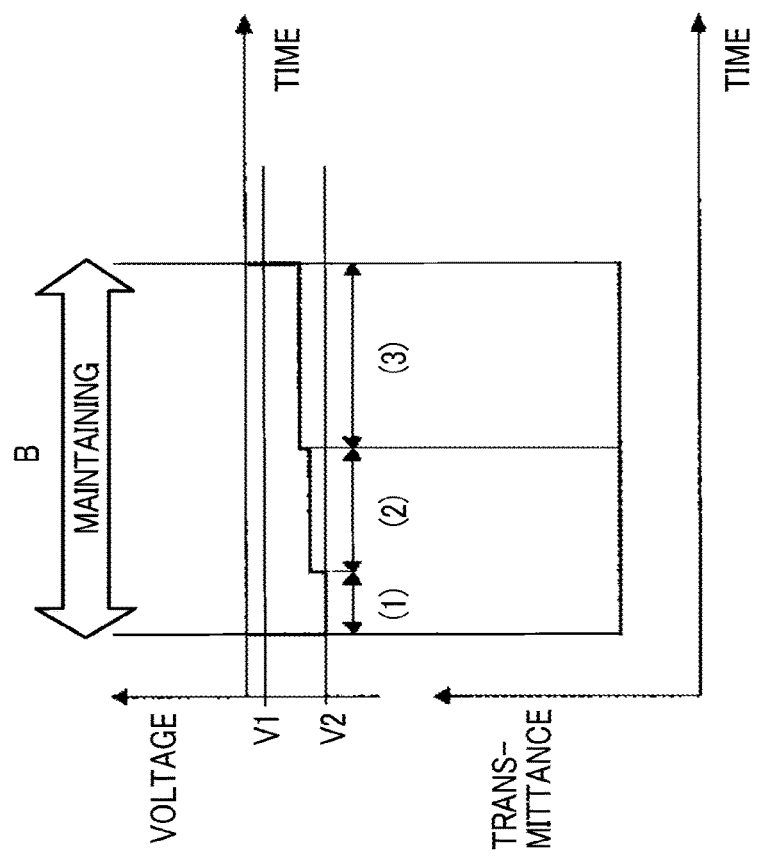
FIG. 11A is an explanatory graph of drive control according to variation 7.

FIG. 11A is an explanatory graph of drive control according to the variation 7. A drive method of the variation 7 is an example in which a stepwise voltage waveform gradually switching to a smaller voltage in a manner opposite to that in FIG. 10A is used in the color developing period A.

(1) is a step of applying between the two electrodes a voltage V2 higher than a threshold voltage V1 required for the electrochromic compound or electrochromic composition to cause color change. (2) to (3) are steps of applying a stepwise voltage waveform maintaining at least two or more voltages between the voltages V1 and V2 between the two electrodes are at least included. Steps (1) to (3) are performed in this order.

During step (1) described above, or during step (2) or step (3) described above, the electrochromic element is put into a desired color developing state. At steps (2) and (3) described above, by applying the stepwise voltage waveform which maintains at least two or more voltages between the voltages V1 and V2 between the two electrodes, it is possible to lower deterioration when the voltage applied to the electrochromic element is made small.

By changing a time length at step (3) according to the temperature as indicated by an arrow, the transmittance in the color developing state is made constant. Specifically, the time length is changed such that the application time ratio of the voltage of a relatively large value increases as the temperature is lower. It is also possible to change the time length such that the total application time is longer as the temperature is lower with a ratio of each voltage constant.

Figure 11B:
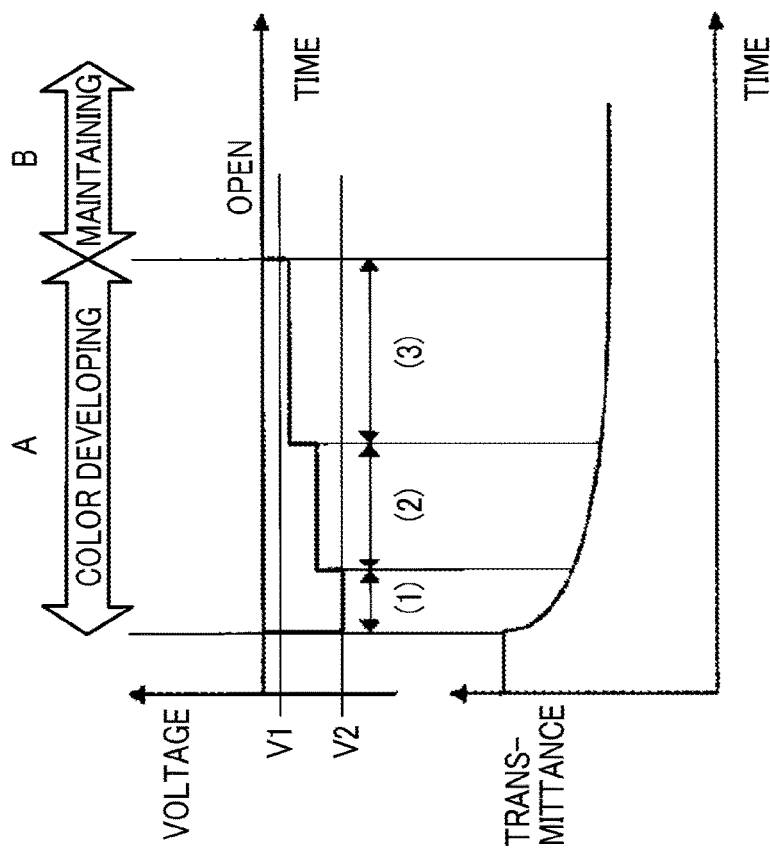
FIG. 11B is an explanatory graph of drive control according to variation 8.

The variation 8 in FIG. 11B is an example in which a stepwise voltage waveform similar to that in FIG. 11A is used in the maintaining period B. Depending on the characteristic of the electrochromic element, the transmittance minutely changes when it is continuously maintained at a constant voltage. Such electrochromic element can be effectively controlled by minutely changing the applied voltage for maintaining according to an elapsed time of maintaining, so as to maintain the transmittance constant. In this control, the applied voltage is changed as follows depending on the temperature. That is, the applied voltage is changed such that the application time ratio of the voltage of the relatively large value increases as the temperature is lower. Alternatively, it is also possible to change the applied voltage such that a total application time in the maintaining period B is longer as the temperature is lower with a ratio of each voltage constant.

Figure 12A:
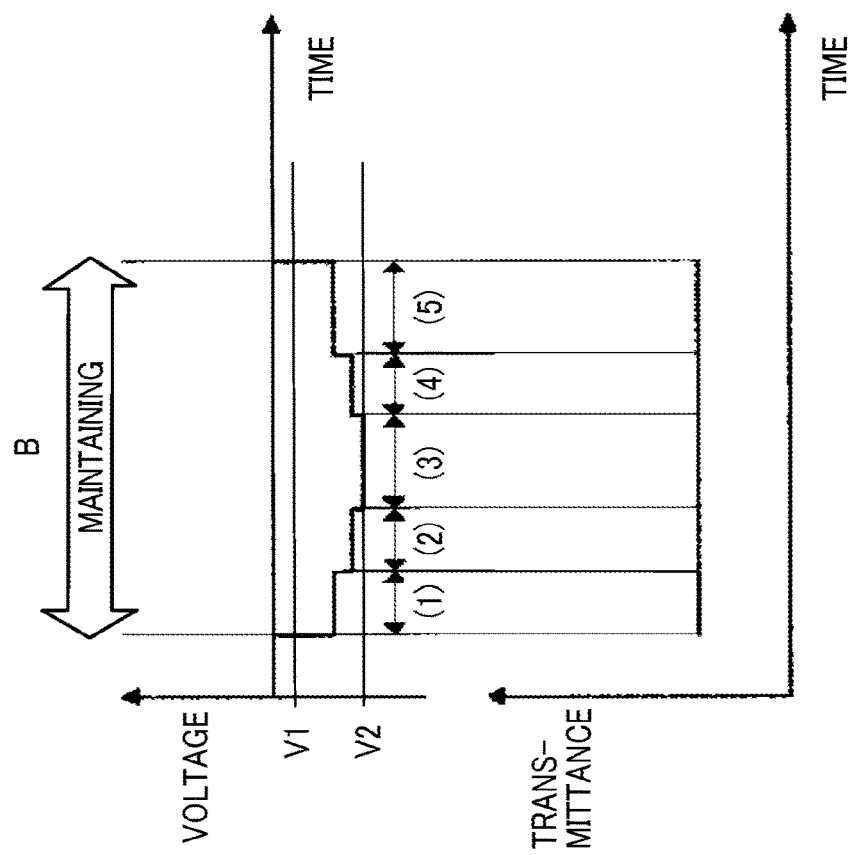
FIG. 12A is an explanatory graph of drive control according to variation 9.
Figure 12B:
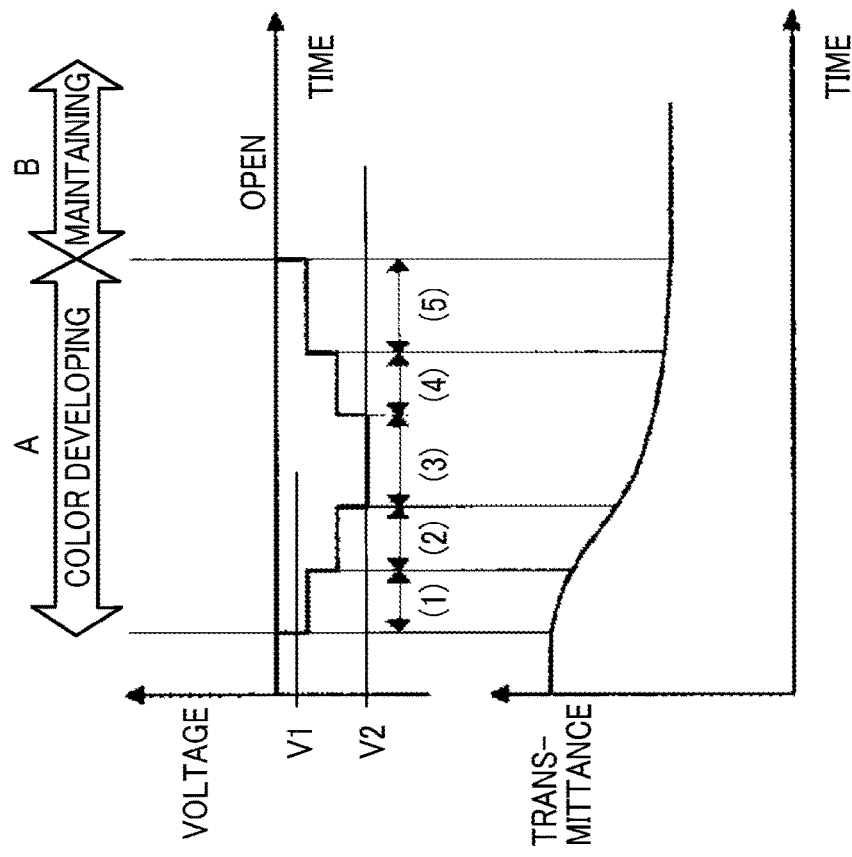
FIG. 12B is an explanatory graph of drive control according to variation 10.

FIG. 12A is an explanatory graph of drive control according to the variation 9. This control adopts both the drive control in the variation 5 illustrated in FIG. 10A and that in the variation 7 illustrated in FIG. 11A. FIG. 12B is an explanatory graph of drive control according to the variation 10. This control adopts both the drive control in the variation 5 illustrated in FIG. 10B and that in the variation 8 illustrated in FIG. 11B.

As described above, in one embodiment, the optical lens device with the electrochromic device is applied to the spectacle lens in the spectacles (light control spectacles). However, the embodiments of the present invention is also applicable to the electrochromic device other than the described spectacles and an application product thereof.

For example, the optical lens device is also applicable to an optical filter device including the electrochromic device, a display device including the electrochromic device, a window including the electrochromic device, a mirror device including the electrochromic device, a projection screen including the electrochromic device, a decorating material including the electrochromic device, and a clothing material including the electrochromic device. These devices to which the optical lens device is applicable are collectively referred to as electrochromic apparatuses. Specific examples of such device are described later.

Although an example of the electrochromic device stable in the color erasing state is described, the device which develops color in a normal state and erases color, further develops color, or changes hue by oxidation and reduction referred to as a normally colored is not excluded. That is, by the oxidation or reduction from the stable state, a predetermined state A and a state B with color different from the state A switch. Any one of the state A and the state B is stable and any one of them is transparent, so that the normally colored one is also effective for temperature dependency countermeasure when shifting the state to the voltage application or driving to maintain the state. A case in which both the states A and B are colored (not transparent) is similar.

In a product obtained by accommodating the electrochromic device in a case, the temperature measuring device is desirably provided in the case. More preferably, the temperature measuring device is provided in the electrochromic device, and desirably, provided around the electrochromic element, and further desirably, provided in the electrochromic element.

Here, details and specific examples of the electrochromic element are described. Basically, the electrochromic element is similar to those of the electrochromic element disclosed in JP-2018-10084-A. As the electrochromic element, it is preferable that a first substrate, a first electrode layer, an electrochromic layer, an insulating inorganic particle layer, a second electrode layer, and a second substrate are included in this order, and an electrolyte is included between the first electrode layer and the second electrode layer.

First Substrate and Second Substrate

The first substrate and the second substrate (hereinafter, in a case where neither is specified, they are sometimes simply referred to as "substrates") are not limited in particular, and well-known thermoformable resin material may be appropriately selected as-is depending on the purpose; there are, for example, resin substrates of a polycarbonate resin, an acrylic resin, a polyethylene resin, a polyvinyl chloride resin, a polyester resin, an epoxy resin, a melamine resin, a phenol resin, a polyurethane resin, a polyimide resin and the like.

It is also possible that a surface of the substrate is coated with a transparent insulating inorganic particle layer, an antireflection layer, and the like in order to improve a water vapor barrier property, a gas barrier property, and visibility.

A shape of the substrate is not limited in particular and may be appropriately selected according to the purpose; for example, there are an elliptical shape, a rectangular shape, and the like. In a case where the light control device is used as the light control spectacles, it is also possible to make the first substrate the lens and make an outer shape of the first substrate a shape according to a rim of the frame.

First Electrode Layer and Second Electrode Layer

A material of the first electrode layer and the second electrode layer (hereinafter, in a case where neither is specified, they are sometimes simply referred to as "electrode layers") is not limited in particular as long as this is a transparent material having conductivity, this may be appropriately selected depending on the purpose, and there are, for example, tin-doped indium oxide (hereinafter, sometimes also referred to as "ITO"), fluorine-doped tin oxide (hereinafter, sometimes also referred to as "FTO"), antimony-doped tin oxide (hereinafter, sometimes also referred to as "ATO") and the like.

It is preferable to include, among them, at least any one of indium oxide (hereinafter, sometimes also referred to as "In oxide"), tin oxide (hereinafter, sometimes also referred to as "Sn oxide"), and zinc oxide (hereinafter, sometimes also referred to as "Zn oxide") formed by vacuum film formation from the viewpoint that they are materials easily formed by sputtering and that excellent transparency and electroconductivity may be obtained. Among them, InSnO, GaZnO, SnO, $In_2O_3$, and ZnO are preferable in particular. Furthermore, a network electrode of silver, gold, carbon nanotube, metal oxide and the like having transparency and a composite layer of them are also useful.

An average thickness of the electrode layer is not limited in particular and may be appropriately selected depending on the purpose; however, it is preferably adjusted such that an electrical resistance value required for oxidation-reduction reaction of electrochromic may be obtained, and this is preferably 50 nm or larger and 500 nm or smaller in a case where ITO is used.

Electrochromic Layer

The electrochromic layer is not limited in particular as long as this includes the electrochromic compound and this may be appropriately selected according to the purpose. The electrochromic material is not limited in particular and may be appropriately selected depending on the purpose; there are, for example, an inorganic electrochromic compound, an organic electrochromic compound, and a conductive high molecule known to exhibit electrochromism.

Examples of the inorganic electrochromic compound include a tungsten oxide, a molybdenum oxide, an iridium oxide, and a titanium oxide, for example. Examples of the organic electrochromic compound include viologen, rare earth phthalocyanine, styryl and the like, for example. Examples of the conductive high molecule include polypyrrole, polythiophene, polyaniline, or derivatives thereof, for example.

As the electrochromic layer, a structure in which a conductive or semiconductor microparticle supports the organic electrochromic compound is preferably used. Specifically, this is the structure in which the microparticles of particle diameters of about 5 nm to 50 nm are sintered on an electrode surface, and a surface of the microparticle absorbs the organic electrochromic compound having a polar group such as a phosphonic acid and carboxyl group, and a silanol group.

Since electrons are efficiently injected into the organic electrochromic compound by utilizing a large surface effect of the microparticle, this structure responds quickly as compared to a conventional electrochromic display element. Furthermore, since it is possible to form a transparent film as a display layer by using the microparticle, high color developing density of an electrochromic pigment may be obtained. It is also possible that the conductive or semiconductor microparticles support a plurality of types of organic electrochromic compounds.

As the electrochromic material, there specifically are azobenzene series, anthraquinone series, diarylethene series, dihydroprene series, dipyridine series, styryl series, styryl spiropyran series, spirooxazine series, spirothiopyran series, thioindigo series, tetrathiafulvalene series, terephthalic acid series, triphenylmethane series, triphenylamine series, naphthopyran series, viologen series, pyrazoline series, phenazine series, phenylenediamine series, phenoxazine series, phenothiazine series, phthalocyanine series, fluoran series, fulgide series, benzopyran series, and metallocene series low molecule organic electrochromic compounds, and conductive high molecule compounds such as polyaniline and polythiophene as polymer series and pigment series electrochromic compounds.

Among them, the viologen series compound or dipyridine series compound are preferable from the viewpoint of low color developing/erasing potential and excellent color value.

Examples of the viologen series compound include, for example, the compound disclosed in JP-3955641-B and JP-2007-171781-A. Examples of the dipyridine series compound include, for example, the compound disclosed in JP-2007-171781-A and JP-2008-116718-A. Among them, the dipyridine series compound expressed by the following General Formula 1 is preferable from the viewpoint of exhibiting an excellent color developing color value.

Examples of the viologen series compound include, for example, the compound disclosed in JP-3955641-B and JP-2007-171781-A.

Examples of the dipyridine series compound include, for example, the compound disclosed in JP-2007-171781-A and JP-2008-116718-A.

Among them, the dipyridine series compound expressed by the following General Formula 1 is preferable from the viewpoint of exhibiting an excellent color developing color value.

General formula 1

[Chemical formula 1]

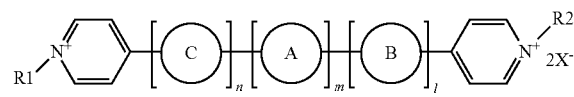

However, in General Formula 1 described above, R1 and R2 represent an alkyl group or an aryl group of carbon number of 1 to 8 which may independently have a substituent group, and at least one of R1 and R2 has the substituent group selected from COOH, PO(OH)2, and Si(OCkH2k+1)3 (where k is 1 to 20). X represents a monovalent anion, and for example, there are Br ion (Br—), Cl ion (Cl—), ClO4 ion (ClO4-), PF6 ion (PF6-), BF4 ion (BF4-) and the like though this is not limited in particular as long as this stably forms a pair with a cation. n, m, and l represent 0, 1, or 2. A, B, and C represent an alkyl group, an aryl group, or a heterocyclic group of carbon number of 1 to 20 which may independently have a substituted group.

Examples of a metal complex series or metal oxide series electrochromic compound include, for example, an inorganic electrochromic compound such as titanium oxide, vanadium oxide, tungsten oxide, indium oxide, iridium oxide, nickel oxide, Prussian blue, and the like.

The conductive or semiconductor microparticles are not limited in particular and may be appropriately selected according to the purpose; however, metal oxides are preferable.

Examples of a material of the metal oxide include, for example, titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, aluminosilicate, calcium phosphate, and metal oxide containing aluminosilicate and the like as a principal component. They may be used alone or two or more of them may be used in combination.

Considering an electric characteristic such as electric conductivity and a physical characteristic such as an optical property, when one selected from titanium oxide, zinc oxide, tin oxide, zirconium oxide, iron oxide, magnesium oxide, indium oxide, and tungsten oxide or a mixture thereof is used, color display excellent in response speed of color development/erasing is possible.

Especially, when titanium oxide is used, color display more excellent in response speed of color development/erasing is possible.

Although a shape of the conductive or semiconductor microparticle is not limited in particular, in order to efficiently support the electrochromic compound, a shape having a large surface area per unit volume (hereinafter, referred to as a specific surface area) is used.

For example, when the microparticle is aggregation of nanoparticles, this has a large specific surface area, so that the electrochromic compounds are more efficiently supported, and a display contrast ratio of color development/erasing is excellent.

An average thickness of the electrochromic layer is not limited in particular and may be appropriately selected depending on the purpose; however, this is preferably 0.2 µm or larger and 5.0 µm or smaller. When the average thickness of the electrochromic layer is smaller than 0.2 µm, the color developing density is sometimes obtained with difficulty, and when this is larger than 5.0 µm, a manufacturing cost increases and visibility is sometimes deteriorated by the color development.

The electrochromic layer and the conductive or semiconductor microparticle layer may be formed by vacuum film formation; however, it is preferable to apply as a particle dispersion paste to form in terms of productivity.

Insulating Inorganic Particle Layer

The insulating inorganic particle layer is a layer for separating the first electrode layer and the second electrode layer such that they are electrically insulated.

A material of the insulating inorganic particle layer is not limited in particular, but an organic material, an inorganic material, or a complex thereof excellent in insulating property, durability, and film formation property is preferable.

As a forming method of the insulating inorganic particle layer, for example, well-known forming methods such as a sintering method (of adding high molecule microparticles and inorganic particles to a binder and the like to be partially fused and utilizing a hole generated between particles), an extracting method (of forming a composition layer by an organic material or an inorganic material soluble to a solvent, a binder not dissolved in the solvent and the like and thereafter dissolving the organic material or the inorganic material by the solvent to obtain a thin hole), a foaming method of foaming by heating or degassing a high molecular weight polymer and the like, a phase inverting method of phase-separating a mixture of high molecules by operating an excellent solvent and a poor solvent, and a radiation emitting method of radiating various radiations to form a thin hole may be used.

Specifically, there are a resin mixed particle film including a metal oxide microparticle (for example, a SiO2 particle, an Al2O3 particle and the like) and a resin binding agent, a porous organic film (for example, a polyurethane resin, a polyethylene resin and the like), an inorganic insulating material film formed on a porous film and the like.

Electrolyte

The electrolyte is a solid electrolyte, and is filled between the first electrode layer and the second electrode layer.

The electrolyte is not limited in particular and may be appropriately selected depending on the purpose; however, this preferably includes inorganic particles which control an average thickness of the electrolyte.

It is preferable to form the insulating inorganic particle layer in advance, then coat the insulating inorganic particle layer with the same as a solution mixed with a curing resin to permeate the layer and thereafter cure the same with light or heat.

The electrolyte may coat the electrochromic layer as a solution mixed with the inorganic particle and the curing resin, and may be thereafter made a film cured with light or heat.

Furthermore, in a case where the electrochromic layer is the layer in which the electrochromic compound is supported by the conductive or semiconductor nanoparticle, it is also possible to coat the electrochromic layer with a solution obtained by mixing the curing resin and the electrolyte so as to permeate the electrochromic layer and make the same the film cured by light or heat.

As an electrolytic solution, for example, there are a liquid electrolyte such as an ionic liquid or a solution obtained by dissolving a solid electrolyte in a solvent.

As a material of the electrolyte, for example, inorganic ion salt such as alkali metal salt and alkali earth metal salt, quaternary ammonium salt, and supporting salts of acids and alkalis may be used, and specifically, 1-ethyl-3-methylimidazolium salt, LiClO4, LiBF4, LiAsF6, LiPF6, LiCF3SO3, LiCF3COO, KCl, NaClO3, NaCl, NaBF4, NaSCN, KBF4, Mg(ClO4)2, Mg(BF4)2 and the like are included. They may be used alone or two or more of them may be used in combination.

As the solvent, for example, propylene carbonate, acetonitrile, γ-butyrolactone, ethylene carbonate, sulfolane, dioxolane, tetrahydrofuran, 2-methyltetrahydrofuran, dimethylsulfoxide, 1,2-dimethoxyethane, 1,2-ethoxymethoxyethane, polyethylene glycol, alcohols and the like may be used. They may be used alone or two or more of them may be used in combination.

As the curing resin, for example, photocurable resins and thermosetting resins such as an acrylic resin, a urethane resin, an epoxy resin, a vinyl chloride resin, an ethylene resin, a melamine resin, and a phenol resin may be used.

Among them, materials having high compatibility with the electrolyte are preferable, and derivatives of ethylene glycols such as polyethylene glycol and polypropylene glycol are more preferred.

As the curing resin, the photocurable resin is preferable from the viewpoint that the element may be manufactured at lower temperature in a shorter time than in a method of thinning by thermal polymerization and evaporation of the solvent.

Among the electrolytes obtained by combining them, a solid solution of a matrix polymer including oxyethylene chain and oxypropylene chain and ionic liquid is preferable in particular from the viewpoint that both hardness and high ion conductivity are easily satisfied.

A particularly preferred combination is an electrolyte layer by using the solid solution of the matrix polymer including oxyethylene chain and oxypropylene chain and the ionic liquid. By using this configuration, it is easy to satisfy both the hardness and high ion conductivity.

As the inorganic particle, a material is not limited in particular as long as this may form a porous layer to maintain the electrolyte and the curing resin, but the material having excellent insulating property, transparency, and durability is preferable from the viewpoint of stability of an electrochromic reaction and visibility. As a specific material, oxides or sulfides of silicon, aluminum, titanium, zinc, tin and the like, or mixtures thereof may be used.

A number average particle diameter of primary particles of the inorganic particles is not limited in particular and may be appropriately selected depending on the purpose; however, this is preferably 10 nm or larger and 10 µm or smaller and more preferably 10 nm or larger and 100 nm or smaller.

Other Layers

Other layers are not limited in particular and may be appropriately selected depending on the purpose; for example, a protective layer and the like may be used.

The protective layer is formed to physically and chemically protect a side surface of the electrochromic element. The protective layer may be formed by applying, for example, an ultraviolet curable insulating resin, a thermosetting insulating resin and the like so as to cover at least any of a side surface and an upper surface, and curing the same thereafter. It is further preferable to make a stacked protective layer of the curing resin and the inorganic material. By making a stacked structure with the inorganic material, a barrier property against oxygen and water is improved.

As the inorganic material, a material having excellent insulating property, transparency, and durability is preferred and there may be, for example, oxides or sulfides of silicon, aluminum, titanium, zinc, tin and the like, or mixtures thereof.

The films may be easily formed by a vacuum film formation process such as sputtering and vapor deposition.

An average thickness of the protective layer is not limited in particular and may be appropriately selected depending on the purpose; however, this is preferably 0.5 µm or larger and 10 µm or smaller.

EXAMPLE

Examples of the present invention are hereinafter described, but the present invention is not at all limited to these examples.

Manufacturing Example 1

Production of Electrochromic Element
Production of First Substrate

As a first substrate, an elliptical polycarbonate substrate having a major axis length of 80 mm, a minor axis length of 55 mm, and an average thickness of 0.5 mm was produced.

Formation of First Electrode Layer

An ITO film having an average thickness of 100 nm was formed on the first substrate as a first electrode layer by sputtering.

Formation of Electrochromic Layer

A titanium oxide nanoparticle dispersion liquid (SP-210, manufactured by Showa Denko Ceramics Co., Ltd., having average particle diameter of 20 nm) was applied to a surface of the obtained first electrode layer by spin coating, and this was annealed for five minutes at 120° C. to form a titanium oxide particle film with an average thickness of 1.0 µm (nanostructure semiconductor material).

Next, as an electrochromic compound, a 2,2,3,3-tetrafluoropropanol solution containing 1.5% by mass of dipyridine series compound expressed by the following Structural Formula (1) was applied by spin coating, and this was annealed for 10 minutes at 120° C. to allow the titanium oxide particle film to support (absorb) the same to form the electrochromic layer.

Structural Formula (1)

[Chemical formula 2]

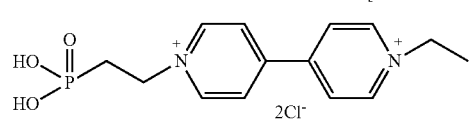

Formation of Insulating Inorganic Particle Layer

On the obtained electrochromic layer, SiO2 particle dispersion liquid having number average particle diameter of primary particles of 20 nm (silica solid content concentration 24.8% by mass, polyvinyl alcohol 1.2% by mass, and water 74.0% by mass) was applied by spin coating to form an insulating inorganic particle layer having an average thickness of 2 µm.

Production of Second Substrate

As a second substrate, a polycarbonate substrate similar to that of the first substrate was produced.

Formation of Second Electrode Layer

On the second substrate, an ITO film having an average thickness of 100 nm was formed by sputtering as a second electrode layer.

Formation of Electrolyte

A surface of the insulating inorganic particle layer to which a solution obtained by mixing polyethylene diacrylate, a photopolymerization initiator (IRGACURE (registered trademark) 184, manufactured by BASF SE), and electrolyte (1-ethyl-3-methyl imidazolium salt) at 100:5:40 (mass ratio) was applied was adhered to a surface of the second electrode layer of the second substrate and UV-cured to form the electrolyte between the first electrode layer and the second electrode layer.

Formation of Protective Layer

On a side surface of the adhered insulating inorganic particle layer and second electrode layer, an ultraviolet curing adhesive (KAYARAD R-604, manufactured by Nippon Kayaku Co., Ltd.) was dropped and cured by ultraviolet light irradiation to form a protective layer having an average thickness of 3 µm.

From above, two electrochromic elements before thermoforming were produced.

Production of Light Control Device
Bending Process of Electrochromic Element

A bending process of pressurizing for 90 seconds at mold temperature of 145° C. with curvature radius of 130 mm was performed to obtain the two electrochromic elements.

Thickening of Electrochromic Element

A convex surface side of the bent electrochromic element was set to the center of a concave mold for injection molding, then a convex mold forming a pair with the concave mold was overlapped with the concave mold to be set in an injection molding machine as the mold having a curved surface of a curvature radius of 90 mm.

A polycarbonate resin was injection molded to the electrochromic element in the mold by the injection molding machine and the two electrochromic elements were thickened.

Outer Shape Process of Electrochromic Element

The two thickened electrochromic elements were processed into a lens shape so as to be accommodated in a rim shape in a frame of light control spectacles, and projections having a width of 3 mm and a length of 5 mm were formed on both sides in a major axis direction of the electrochromic element.

Formation of Electrode Pad in Electrochromic Element

A silver paste (Dotite, manufactured by FUJIKURA KASEI CO., LTD.) as a conductive adhesive was applied to each of the projections in the two electrochromic elements with a brush or a toothpick, this was wrapped with copper foil to be cured for 15 minutes at 60° C. to electrically connect an end of the first electrode layer or the second electrode layer exposed by grinding the protective layer by the lens shaping process and the copper foil with the silver paste to form an electrode pad.

Production of Light Control Spectacles

Next, the electrochromic elements were mounted on the rim of the frame equipped with a first light amount measuring device, a second light amount measuring device, a switch, a power source, and a control device to electrically connect the electrode pad to a connecting member arranged on the frame to produce the spectacles (light control spectacles) 100 as the light control device.

Another application device example of the embodiments of the present invention is described. In each example, by adding a temperature measuring device, the embodiments of the present invention may be applied as a drive method of the electrochromic element or device.

Glass Device

The embodiments of the present invention is applicable to a head-mounted display which is a spectacle type (so-called glass device) display device. For example, the glass device has a digital information display function referred to as smart glass or augmented reality (AR) glass. A monocular image display device disclosed in JP-2017-198825-A is described as an example.

Figure 13:
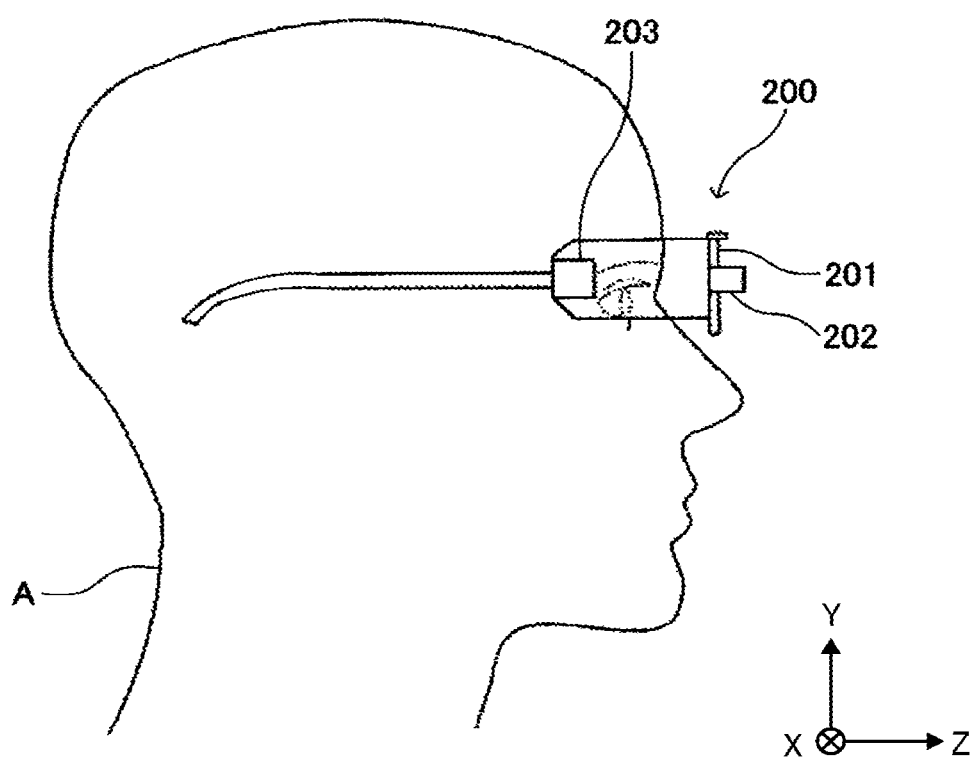
FIG. 13 is a schematic configuration of a head-mounted display which is an example of an electrochromic apparatus.
Figure 14:
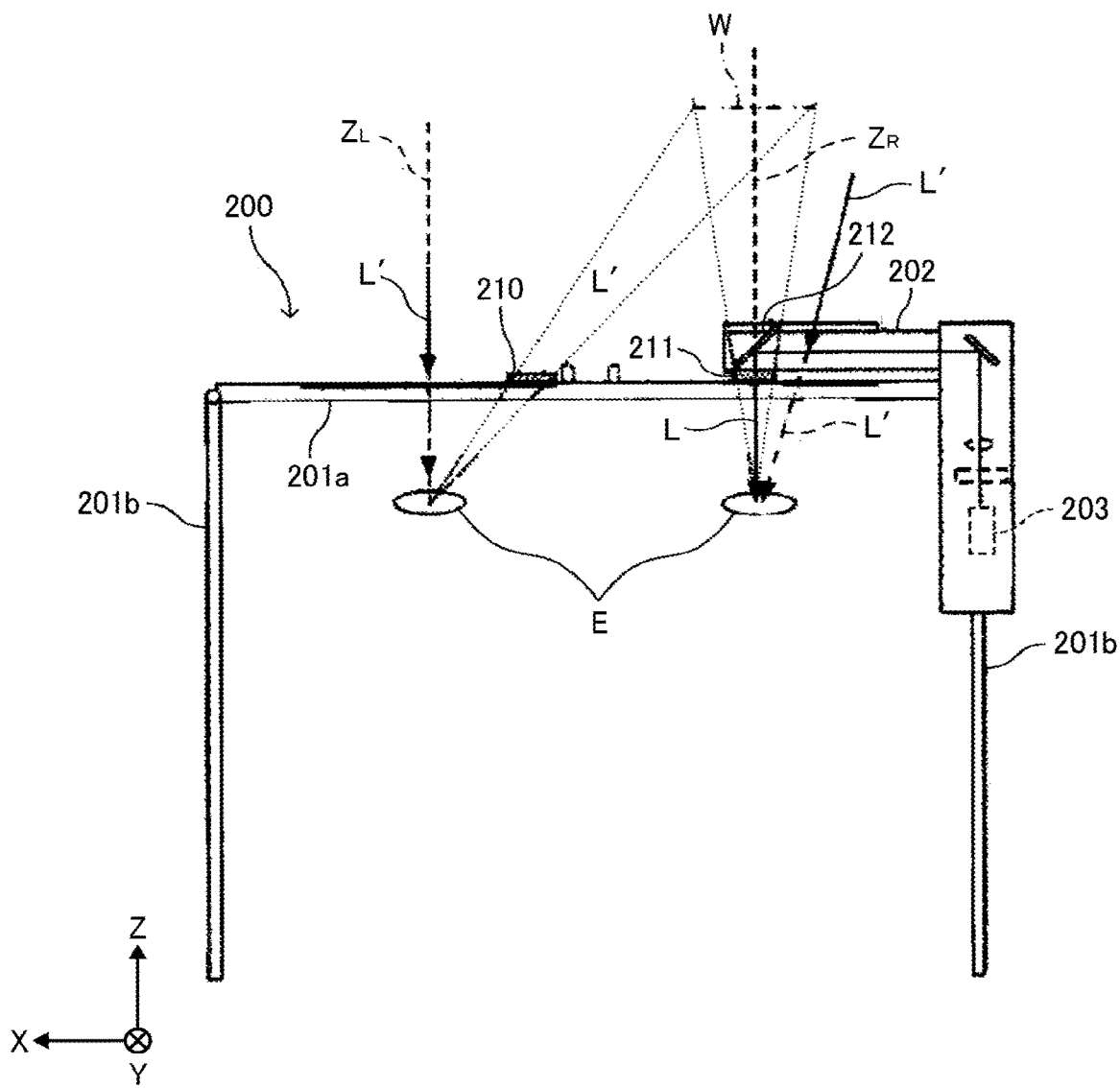
FIG. 14 is a plan view of a state in which the head-mounted display in FIG. 13 is mounted.

FIG. 13 illustrates a schematic configuration of an image display device 200 as a head-mounted display which is a monocular image display device. FIG. 14 is a plan view of a mounted state. In FIG. 13, the image display device 200 includes a casing 201 as a spectacle-shaped casing mounted on a head of a user A, an image display 202 as a virtual image forming device for displaying an image in front of a right eye, and an image output device 203 as a projecting device for outputting the image.

In FIG. 14, the image display device 200 includes a first light amount adjusting device 210 arranged in front of a left eye, and a second light amount adjusting device 211 which covers upper and lower portions of a virtual image formed by the image display 202 in front of the right eye. The casing 201 includes a transparent front surface 201a and a side surface 201b which supports the front surface 201a. The image output device 203 is an image projection device including a projection type optical system. The image display 202 includes a reflector 212 which reflects the image emitted from the image output device 203 toward the right eye. The user A recognizes the image reflected by the reflector 212 as the virtual image present within a range of an image area W illustrated in FIG. 14. In the drawing, $X_L$ and $Z_R$ represent optical axes of left and right eyes E, and LL' represents external light.

In this embodiment, both the first light amount adjusting device 21 and the second light amount adjusting device 22 are light control filters using the electrochromic element attached to the casing 101. Each of the first light amount adjusting device 21 and the second light amount adjusting device 22 is a transmittance control device which controls a transmittance by voltage application and a light amount control device which controls a light amount of the external light L' arriving at the eye E of the user A.

Optical Filter

It is possible to apply to an optical filter which is an optical element which transmits only light having a predetermined property out of incident light (for example, light in a specific wavelength range) and does not transmit other light. A neutral density (ND) filter for camera disclosed in JP-2004-205628-A is used as an example.

Figure 15:
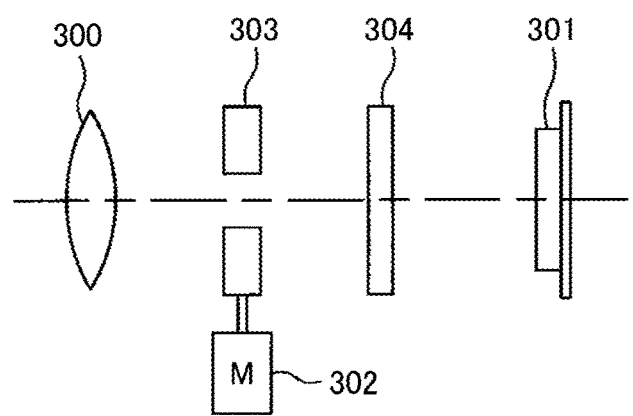
FIG. 15 is a schematic diagram of an optical system of a digital camera which is an example of an electrochromic apparatus.

FIG. 15 is a schematic diagram illustrating an arrangement example of a substantial part of an optical system of a digital camera (still camera, video camera and the like) including the electrochromic device. A mechanic diaphragm 303 by drive of a motor 302 and an ND filter 304 by an electrochromic element (EC element) are sequentially arranged on an optical axis from a lens 300 to an imaging element 301 such as a CCD. When brightness of an object measured by a photometry element separately equipped is within a predetermine value, the EC element ND filter 304 loses color. When object brightness becomes larger than the predetermined value, and the diaphragm 303 may no longer appropriately adjust exposure, a predetermined coloring voltage (for example, 2.0 V) is applied to the EC element ND filter 304 to put the same into a coloring state to reduce light. After that, when the object brightness decreases so as to be lower than the predetermined value, a predetermined color erasing voltage is applied to the EC element ND filter 304 (or both electrodes are short-circuited) to put the same into a color erasing state.

Display Device

Various display devices including an electrochromic element are known. A display device disclosed in JP-2014-119639-A may be used as an example.

Figure 16:
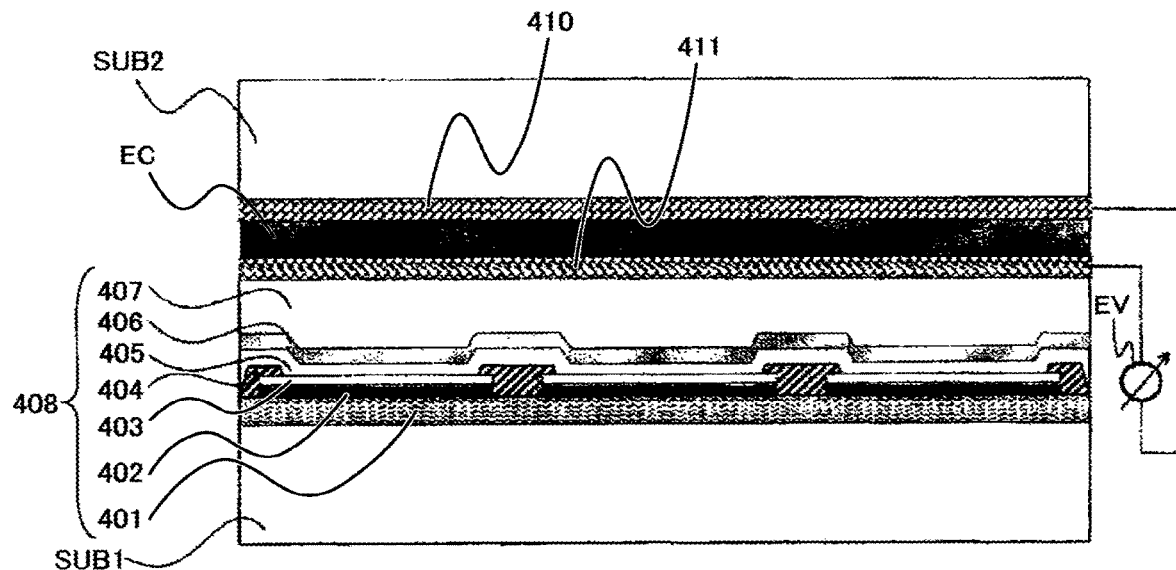
FIG. 16 is a cross-sectional view of a display device which is an example of an electrochromic apparatus.

FIG. 16 is a cross-sectional view illustrating a configuration of a display device (display device) including the electrochromic element of the above-described embodiment. A top emission type organic electroluminescence (EL) display panel (PNL) 408 is formed on a first substrate (SUB1) side.

The organic EL display panel (PNL) 408 includes a first substrate (SUB1), a TFT circuit formed portion 401, a reflective layer 402, an OLED lower electrode 403, an insulating layer 404, a white light emitting layer 405, an OLED upper transparent electrode 406, and a sealing layer/filling layer 407.

An electrochromic layer (EC) serving as a filter is formed on a second substrate (SUB2) side. The electrochromic layer (EC) is interposed between an EC upper transparent electrode 410 and an EC lower transparent electrode 411 and controls a voltage (EV in FIG. 1) supplied to the EC upper transparent electrode 410 and the EC lower transparent electrode 411 to control a drive voltage to be applied to the electrochromic layer (EC), thereby changing a spectrum of transmission light transmitted through the electrochromic layer (EC).

Light Control Window

It is known that a light control window using an electrochromic element for controlling light is used for a window for conveyances such as an airplane and buildings. A light control window disclosed in JP-2018-155796-A may be used as an example.

Figure 17A:
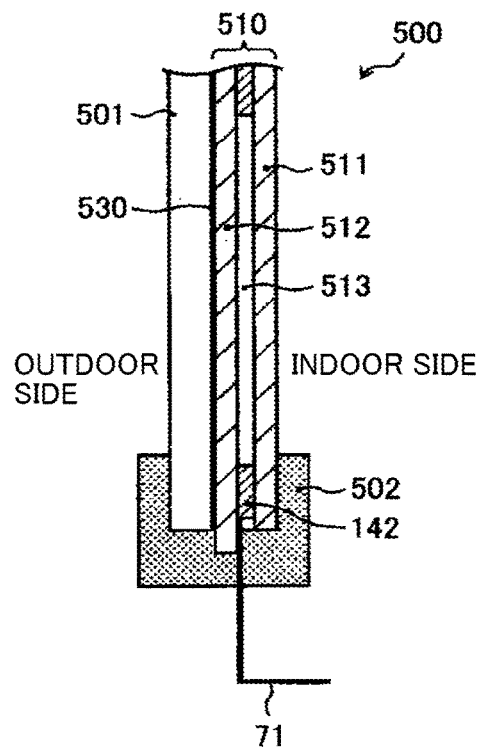
FIG. 17A is an explanatory view of a light control window which is an example of an electrochromic apparatus.
Figure 17B:
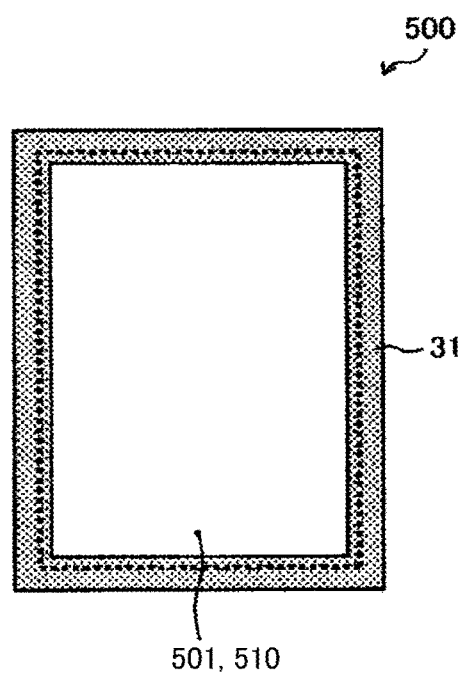
FIG. 17B is an explanatory view of a light control window which is an example of an electrochromic apparatus.

FIGS. 17A and 17B are explanatory views of the light control window including the electrochromic element of the above-described embodiment. FIG. 17A is a cross-sectional view and FIG. 17B is a front view. This light control window 500 includes a window glass 501, a grating channel 502, and a light control device 510. The light control device 510 is an electrochromic device including an electrochromic layer 513 interposed between a pair of counter electrodes 511 and 512.

As illustrated in FIG. 17B, the light control device 510 is arranged so as to be superimposed on a plate surface of the window glass 501 as seen in a direction perpendicular to the plate surface of the window glass 501. The light control device 510 changes a transmittance of incident light incident on the light control device 510 through the window glass 501 to adjust a transmittance of the light. The light control device 510 is attached to the plate surface on an indoor side of the window glass 501 and changes the transmittance of the incident light incident on the light control device 510 through the window glass 501 facing outdoor to control the light. The light control device 510 may also be attached to the window glass 501 with an adhesive layer 530.

Mirror Device

A mirror device including an electrochromic element is known as an electrochromic mirror. For example, an electrochromic mirror disclosed in JP-2005-031628-A may be used as an example.

Figure 18:
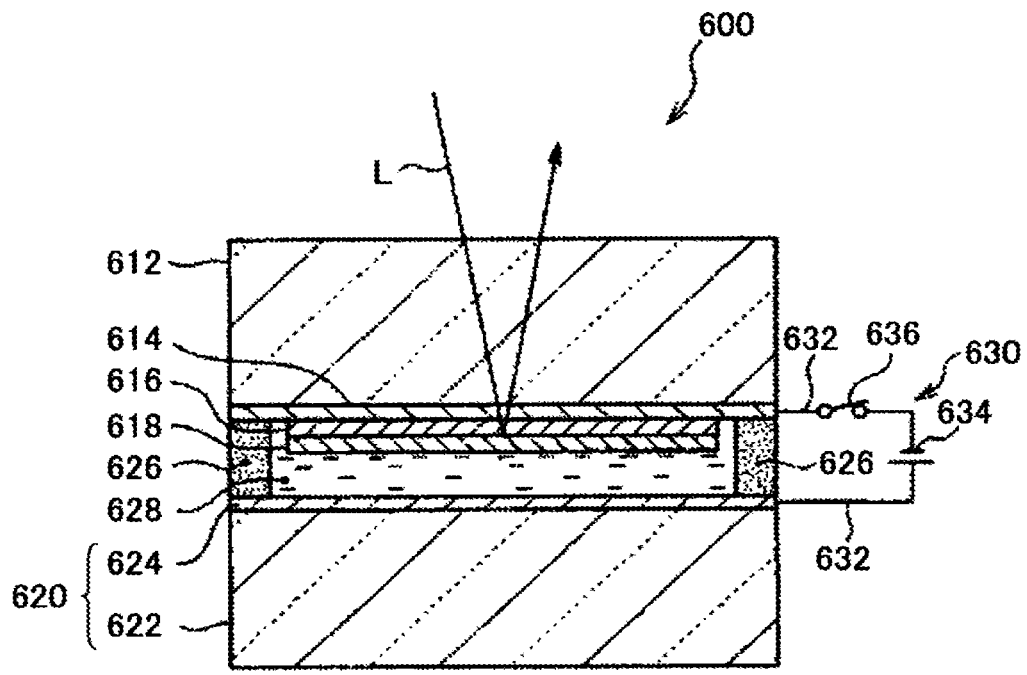
FIG. 18 is a cross-sectional view of an electrochromic mirror which is an example of an electrochromic apparatus.

FIG. 18 is a cross-sectional view of the electrochromic mirror including the electrochromic element of the above-described embodiment. An electrochromic mirror 600 has a configuration in which three layers of a transparent electrode film 614, an electrochromic film 616, and a light reflecting film 618 are formed on a glass substrate 612. The electrochromic film 616 is formed between the transparent electrode film 614 and the light reflecting film 618. A hydrogen ion in an electrolyte solution 628 is forcibly drawn into the electrochromic film 616.

Since it is configured such that light L incident on the glass substrate 612 from a front surface side is reflected by the light reflecting film 618 on a rear surface of the glass substrate 612, occurrence of double image is also prevented. Reference signs 626, 630, 632, 634, and 636 represent a sealant, a power source device, wiring, a direct-current power source, and a switch, respectively.

In the electrochromic mirror 600 configured as described above, when the switch 636 of the power source device 630 is turned "ON", a reflection rate of the electrochromic mirror 600 changes and an antiglare effect is exhibited. In contrast, when the switch 36 of the power source device 630 is turned "OFF" to cancel a voltage and the transparent electrode film 614 and the electrode film 624 are short-circuited through a circuit, a color is erased.

Projection Screen

A screen which reflects to display or transmits to display an image projected by a projector is known. For example, a reflective transparent screen disclosed in JP-2017-090617-A may be used as an example.

Figure 19:
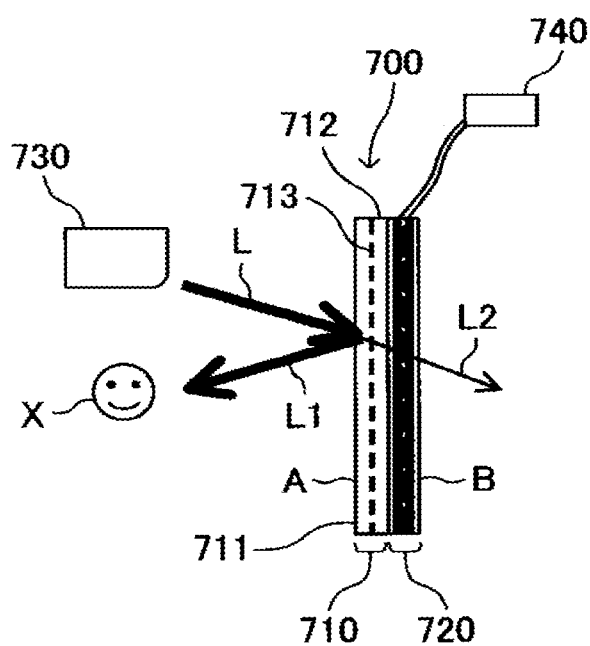
FIG. 19 is an explanatory diagram of a display system using a reflective transparent screen which is an example of an electrochromic apparatus.

FIG. 19 is an explanatory diagram of a display system using a reflective transparent screen including the electrochromic device of the above-described embodiment. A reflective transparent screen 700 displays image light L projected by a projector 730 so as to be visible as an image to an observer X located on a projector side and transmits a scene on an opposite side of the observer X across the screen so as to be visible to the observer X on the projector 730 side.

The reflective transparent screen 700 includes an image display transparent member 710 including an image display 713 interposed between a first transparent base material 711 and a second transparent base material 712 and includes a light control member 720 on a side opposite to the first transparent base material 711 with respect to the second transparent base material 712. The light control member 720 may be formed by using the electrochromic element. This reflective transparent screen 700 includes the light control member 720, so that this may lower a transmittance when projecting the image to maintain privacy of the observer who projects the image.

Decorating Material

It is known to use an electrochromic device as a decorating material as a material to decorate. For example, a decorating device using an electrochromic device disclosed in JP-2015-076658-A may be used as an example.

Figure 20:
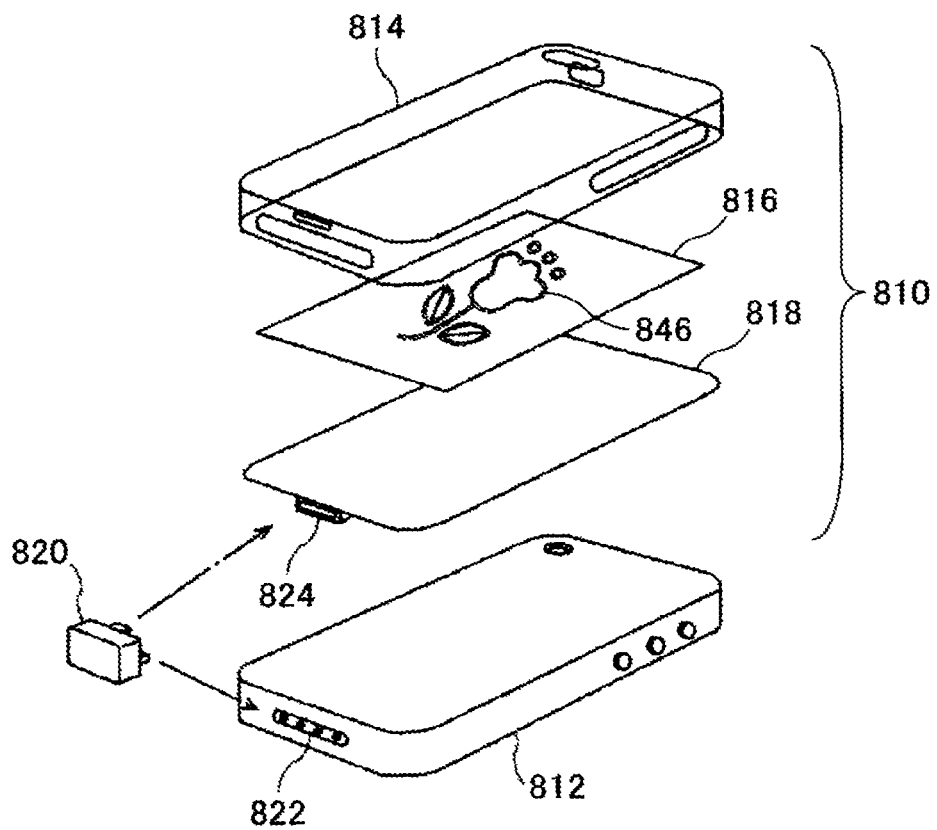
FIG. 20 is an exploded perspective view of a decorating device which is an example of an electrochromic apparatus.

FIG. 20 is an exploded perspective view of a decorating device including the electrochromic device of the above-described embodiment. A smartphone 812 is accommodated in an outer package 814 for protection to be used. The smartphone 812 is illustrated with an operation surface facing downward. On a back surface of the smartphone 812, a display control circuit 818 and a display device 816 are sequentially overlapped and all of them are enclosed by the outer package 814. The outer package 814, the display device 816, and the display control circuit 818 form the decorating device 810.

A display image 846 displayed on the display device 816 is controlled to be rewritten by the display control circuit 818. When rewriting the display image 846 of the display device 816, the display control circuit 818 is supplied with power from the smartphone 812 through a connecting terminal 824 and a connector 820. The connector 820 is for connecting a connection terminal 822 provided on the smartphone 812 and the connecting terminal 824 provided on the display control circuit 818 and has a universal serial bus (USB) connecting structure. As the display device 816, the electrochromic device may be used.

Clothing Material

It is known to use an electrochromic device as a clothing material to decorate what people wear. For example, a display of a footwear as a clothing material disclosed in JP-2018-033983-A is mentioned as an example.

Figure 21:
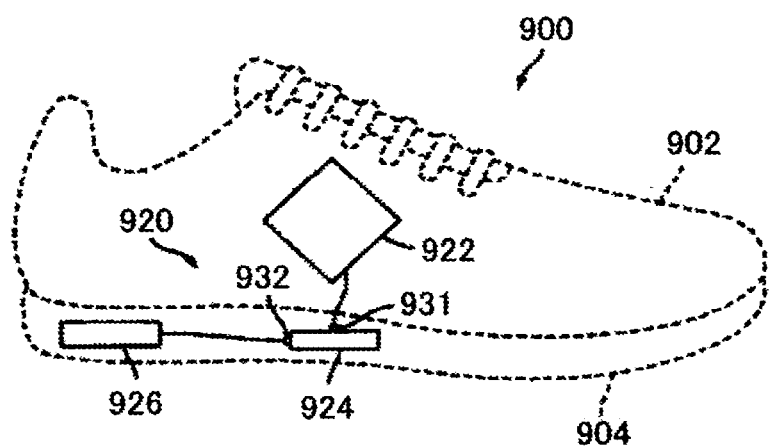
FIG. 21 is an explanatory diagram of a display of a footwear which is an example of an electrochromic apparatus.

FIG. 21 is an explanatory diagram of a display of a footwear including the electrochromic device of the above-described embodiment. A footwear 900 includes a color changing system 920. The color changing system 920 includes a color changing portion 922 provided on an upper 902 of the footwear 900 and a controller 924 and a power storage device 925 provided on a sole of the footwear 900. The color changing portion 922 is connected to a port 931 of the controller 924, and the power storage device 925 is connected to a port 932 of the controller 924. This color changing portion 922 includes the electrochromic device and color of the color changing portion 922 is changed by an electric signal from the controller 924.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

As described above, in one embodiment, an electrochromic device includes: an electrochromic element operating in at least one of a first optical characteristic state and a second optical characteristic state; a temperature measuring device configured to measure temperature; and circuitry to control voltage to be applied to the electrochromic element such that the second optical characteristic state becomes constant irrespective of the measured temperature.

In one example, the circuitry changes a length of a period in which voltage is applied to shift from the first optical characteristic state to the second optical characteristic state such that the second optical characteristic state becomes constant irrespective of the measured temperature.

In another example, the circuitry applies a periodic fluctuation voltage periodically fluctuating in at least one period of a period in which voltage is applied to shift from the first optical characteristic state to the second optical characteristic state and a period in which voltage is applied to maintain the second optical characteristic state, and adjusts an application time ratio of a voltage of a relatively large value in one period of the periodic fluctuation voltage such that the second optical characteristic state becomes constant irrespective of temperature.

In any one of the above-described examples, light transmittance may be smaller in the second optical characteristic state than in the first optical characteristic state.

In any one of the above-described examples, the electrochromic element may include an electrochromic layer between a pair of electrodes, and the pair of electrodes are short-circuited in a period in which the second optical characteristic state is shifted to the first optical characteristic state.

In any one of the above-described examples, the circuitry may further change a value of the voltage to be applied such that the optical characteristic state becomes constant.

In any one of the above-described examples, the electrochromic device may further include a memory that stores a parameter that changes according to temperature or a software program describing a parameter calculating process. The circuitry rewrites the parameter or software program stored in the memory.

The invention claimed is:

1. An electrochromic device comprising:
   an electrochromic element operating in at least one of a first optical characteristic state and a second optical characteristic state;
   a temperature sensor to measure temperature; and
   circuitry configured to control voltage to be applied to the electrochromic element, such that the second optical characteristic state becomes constant irrespective of the measured temperature,
   wherein the voltage to be applied includes a plurality of periods of a periodic fluctuation voltage, and each of the periods of the periodic fluctuation voltage includes times for applying at least two voltages of different magnitudes respectively.

2. The electrochromic device of claim 1,
   wherein the circuitry controls to change a length of a period in which voltage is applied to shift from the first optical characteristic state to the second optical characteristic state such that the second optical characteristic state becomes constant irrespective of the measured temperature.

3. The electrochromic device of claim 1,
   wherein the circuitry controls to apply the periodic fluctuation voltage periodically fluctuating in at least one period of a period in which voltage is applied to shift from the first optical characteristic state to the second optical characteristic state and a period in which voltage is applied to maintain the second optical characteristic state, and adjusts an application time ratio of a voltage of a relatively large value in one period of the periodic fluctuation voltage such that the second optical characteristic state becomes constant irrespective of temperature.

4. The electrochromic device according to claim 1,
   wherein light transmittance is smaller in the second optical characteristic state than in the first optical characteristic state.

5. The electrochromic device according to claim 1,
   wherein the second optical characteristic state is shifted to the first optical characteristic state,
   wherein the electrochromic element includes an electrochromic layer between a pair of electrodes, and the pair of electrodes are short-circuited in a period in which the second optical characteristic state is shifted to the first optical characteristic state.

6. The electrochromic device according to claim 1,
   wherein the circuitry further changes a value of the voltage to be applied such that the second optical characteristic state becomes constant.

7. The electrochromic device according to claim 1, further comprising: a memory that stores a parameter that changes according to temperature or a software program describing a parameter calculating process,
   wherein the circuitry rewrites the parameter or software program stored in the memory.

8. An electrochromic apparatus comprising the electrochromic device according to claim 1,
   the electrochromic apparatus being any one of an optical lens device, spectacles including the optical lens device, a glass device having an information display function, an optical filter, a display device, a window, a mirror device, a projection screen, a decorating material, and a clothing material.

9. A control device for controlling an electrochromic device including: an electrochromic element operating in at least one of a first optical characteristic state and a second optical characteristic state; and a temperature sensor to measure temperature, the control device comprising:
   circuitry configured to control voltage to be applied to the electrochromic element such that the second optical characteristic state becomes constant irrespective of measured temperature,
   wherein the voltage to be applied includes a plurality of periods of a periodic fluctuation voltage, and each of the periods of the periodic fluctuation voltage includes times for applying at least two voltages of different magnitudes respectively.

10. The control device of claim 9, wherein the circuitry changes a length of a period in which voltage is applied to shift from the first optical characteristic state to the second optical characteristic state such that the second optical characteristic state becomes constant irrespective of measured temperature.

11. The control device of claim 9, wherein the circuitry applies the periodic fluctuation voltage periodically fluctuating in at least one period of a period in which voltage is applied to shift from the first optical characteristic state to the second optical characteristic state and a period in which voltage is applied to maintain the second optical characteristic state, and adjusts an application time ratio of a voltage of a relatively large value in one period of the periodic fluctuation voltage such that the second optical characteristic state becomes constant irrespective of temperature.

12. A control method of an electrochromic device for controlling an electrochromic device including: an electrochromic element operating in at least one of a first optical characteristic state and a second optical characteristic state; and a temperature sensor to measure temperature, the control method comprising:
   controlling voltage to be applied to the electrochromic element such that the second optical characteristic state becomes constant irrespective of temperature,
   wherein the voltage to be applied includes a plurality of periods of a periodic fluctuation voltage, and each of the periods of the periodic fluctuation voltage includes times for applying at least two voltages of different magnitudes respectively.

13. The control method of claim 12, wherein the controlling includes:
changing a length of a period in which voltage is applied to shift from the first optical characteristic state to the second optical characteristic state such that the second optical characteristic state becomes constant irrespective of temperature.

14. The control method of claim 12, wherein the controlling includes:
applying the periodic fluctuation voltage periodically fluctuating in at least one period of a period in which voltage is applied to shift from the first optical characteristic state to the second optical characteristic state and a period in which voltage is applied to maintain the second optical characteristic state; and
adjusting an application time ratio of a voltage of a relatively large value in one period of the periodic fluctuation voltage such that the second optical characteristic state becomes constant irrespective of temperature.

* * * * *